(12) United States Patent
Storey et al.

(10) Patent No.: US 8,063,154 B2
(45) Date of Patent: Nov. 22, 2011

(54) PREPARATION OF EXO-OLEFIN TERMINATED POLYOLEFINS VIA QUENCHING WITH ALKOXYSILANES OR ETHERS

(75) Inventors: Robson F. Storey, Hattiesburg, MS (US); Lisa K. Kemp, Hattiesburg, MS (US)

(73) Assignee: The University of Southern Mississippi, Hattiesburg, MS (US)

( * ) Notice: Subject to any disclaimer, the term of this patent is extended or adjusted under 35 U.S.C. 154(b) by 575 days.

(21) Appl. No.: 12/145,460

(22) Filed: Jun. 24, 2008

(65) Prior Publication Data
US 2009/0318624 A1 Dec. 24, 2009

(51) Int. Cl.
C08F 8/00 (2006.01)
(52) U.S. Cl. ........ 525/342; 525/242; 525/268; 525/269; 525/270; 525/298; 525/333.7; 525/349; 525/375; 525/385
(58) Field of Classification Search .................. 525/242, 525/268, 270, 269, 298, 333.7, 342, 349, 525/375, 385
See application file for complete search history.

(56) References Cited

U.S. PATENT DOCUMENTS

| | | |
|---|---|---|
| 3,155,686 A | 11/1964 | Prill et al. |
| 3,632,600 A | 1/1972 | Morris et al. |
| 4,034,038 A | 7/1977 | Vogel |
| 4,152,499 A | 5/1979 | Boerzel et al. |
| 4,238,628 A | 12/1980 | Cahill et al. |
| 4,255,538 A | 3/1981 | Skillicorn |
| 4,276,394 A | 6/1981 | Kennedy et al. |
| 4,342,849 A | 8/1982 | Kennedy |
| 4,393,199 A | 7/1983 | Manser |
| 4,468,291 A | 8/1984 | Naarmann et al. |
| 4,486,572 A | 12/1984 | Kennedy |
| 4,568,732 A | 2/1986 | Kennedy et al. |
| 4,758,631 A | 7/1988 | Kennedy et al. |
| 4,814,405 A | 3/1989 | Kennedy |
| 4,910,321 A | 3/1990 | Kennedy et al. |
| 4,929,683 A | 5/1990 | Kennedy et al. |
| 4,943,616 A | 7/1990 | Mishra et al. |
| 4,946,899 A | 8/1990 | Kennedy et al. |
| 4,948,936 A | 8/1990 | Landry |
| 5,032,653 A | 7/1991 | Cheradame et al. |
| 5,066,730 A | 11/1991 | Kennedy et al. |
| 5,112,507 A | 5/1992 | Harrison |
| 5,122,572 A | 6/1992 | Kennedy et al. |
| 5,169,914 A | 12/1992 | Kaszas et al. |
| 5,175,225 A | 12/1992 | Ruhe, Jr. |
| 5,219,948 A | 6/1993 | Storey et al. |
| 5,225,492 A | 7/1993 | Kennedy et al. |
| 5,286,823 A | 2/1994 | Rath |
| 5,300,701 A | 4/1994 | Cherpeck |
| 5,334,321 A | 8/1994 | Harrison et al. |
| 5,336,745 A | 8/1994 | Cheradame et al. |
| 5,340,881 A | 8/1994 | Kennedy et al. |
| 5,350,819 A | 9/1994 | Shaffer |
| 5,366,745 A | 11/1994 | Daden |
| 5,395,885 A | 3/1995 | Kennedy et al. |
| 5,428,111 A | 6/1995 | Faust et al. |
| 5,444,135 A | 8/1995 | Cheradame et al. |
| 5,448,000 A | 9/1995 | Gullapalli et al. |
| 5,451,647 A | 9/1995 | Faust et al. |
| 5,464,549 A | 11/1995 | Sieberth |
| 5,488,000 A | 1/1996 | Zhang et al. |
| 5,506,316 A | 4/1996 | Shaffer |
| 5,580,935 A | 12/1996 | Shaffer |
| 5,616,668 A | 4/1997 | Harrison et al. |
| 5,629,394 A | 5/1997 | Cheradame et al. |
| 5,637,647 A | 6/1997 | Faust et al. |
| 5,663,457 A | 9/1997 | Kolp |
| 5,663,470 A | 9/1997 | Chen et al. |
| 5,677,386 A | 10/1997 | Faust et al. |
| 5,690,861 A | 11/1997 | Faust |
| 5,777,044 A | 7/1998 | Faust |
| 5,945,491 A | 8/1999 | Matyjaszewski et al. |

(Continued)

FOREIGN PATENT DOCUMENTS

DE 237072 7/1986

(Continued)

OTHER PUBLICATIONS

Kemp, L.K.; Synthesis and Characterization of Novel Polyisobutylene-Based Materials: Gradient Block Copolymers, Exo-Olefins via in situ Quenching, and Carboxylic Acid-Functional Telechelics; Thesis Dissertation, University of Southern Mississippi, Dec. 2007, p. 73-118.*

(Continued)

*Primary Examiner* — David W Wu
*Assistant Examiner* — Robert Jones
(74) *Attorney, Agent, or Firm* — Jones Day

(57) ABSTRACT

Provided herein are methods for preparing a polyolefin containing one or more exo-olefinic end groups on the polyolefin chain, comprising quenching an ionized polyolefin with an alkoxysilane or an ether. In some embodiments, the methods are represented by the following scheme:

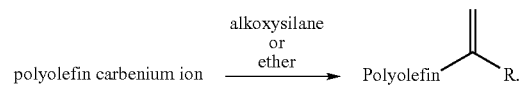

In some embodiments, the alkoxysilane or ether compound has the formula:

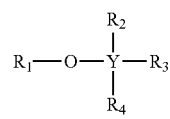

wherein Y is carbon or silicon;
$R_1$ is hydrocarbyl; and $R_2$-$R_4$ are each, independently, hydrogen or hydrocarbyl.

97 Claims, No Drawings

U.S. PATENT DOCUMENTS

| | | | |
|---|---|---|---|
| 5,948,936 | A | 9/1999 | Itoh et al. |
| 6,033,446 | A | 3/2000 | Cherpeck et al. |
| 6,121,379 | A * | 9/2000 | Yamanaka et al. ............ 525/106 |
| 6,194,597 | B1 | 2/2001 | Faust et al. |
| 6,407,066 | B1 | 6/2002 | Dressen et al. |
| 6,451,920 | B1 | 9/2002 | Harrison et al. |
| 6,468,948 | B1 | 10/2002 | Rossi et al. |
| 6,515,083 | B2 | 2/2003 | Ozawa et al. |
| 6,642,318 | B1 | 11/2003 | Chiefari et al. |
| 6,753,391 | B1 | 6/2004 | Lewandowski et al. |
| 6,818,716 | B2 | 11/2004 | Wendland et al. |
| 6,906,011 | B2 | 6/2005 | Harrison et al. |
| 6,969,744 | B2 | 11/2005 | Stokes et al. |
| 7,071,275 | B2 | 7/2006 | Rath et al. |
| 7,124,110 | B1 | 10/2006 | Kemp, II et al. |
| 7,244,870 | B2 | 7/2007 | Lange et al. |
| 7,420,019 | B2 | 9/2008 | Stokes |
| 7,501,476 | B2 | 3/2009 | Stokes |
| 7,576,161 | B2 | 8/2009 | Stokes |
| 7,705,090 | B2 | 4/2010 | Stokes |
| 7,709,580 | B2 | 5/2010 | Stokes |
| 7,816,459 | B2 | 10/2010 | Stokes |
| 2002/0082367 | A1 | 6/2002 | McConville et al. |
| 2002/0132905 | A1 | 9/2002 | Babinee et al. |
| 2003/0105194 | A1 | 6/2003 | Suart et al. |
| 2003/0162858 | A1 | 8/2003 | Faust et al. |
| 2003/0191257 | A1 | 10/2003 | Wettling et al. |
| 2004/0015029 | A1 | 1/2004 | Lange et al. |
| 2004/0260033 | A1 | 12/2004 | Stokes et al. |
| 2005/0282972 | A1 | 12/2005 | Stokes et al. |
| 2006/0041081 | A1 | 2/2006 | Stokes et al. |
| 2006/0041083 | A1 | 2/2006 | Stokes et al. |
| 2006/0041084 | A1 | 2/2006 | Stokes et al. |
| 2006/0135721 | A1 | 6/2006 | Lange et al. |
| 2006/0264577 | A1 | 11/2006 | Faust et al. |
| 2007/0155908 | A1 | 7/2007 | Stokes et al. |
| 2007/0155910 | A1 | 7/2007 | Stokes |
| 2007/0155911 | A1 | 7/2007 | Stokes et al. |
| 2009/0247716 | A1 | 10/2009 | Stokes et al. |
| 2009/0258803 | A1 | 10/2009 | Harrison et al. |
| 2009/0318624 | A1 | 12/2009 | Storey et al. |
| 2010/0099835 | A1 | 4/2010 | Stokes |
| 2010/0249001 | A1 | 9/2010 | Storey et al. |
| 2011/0028681 | A1 | 2/2011 | Storey et al. |

FOREIGN PATENT DOCUMENTS

| | | |
|---|---|---|
| DE | 240308 | 10/1986 |
| DE | 253827 | 2/1988 |
| DE | 262028 | 11/1988 |
| DE | 262233 | 11/1988 |
| DE | 266104 | 3/1989 |
| DE | 282697 | 9/1990 |
| DE | 296283 | 11/1991 |
| DE | 296284 | 11/1991 |
| DE | 296285 | 11/1991 |
| DE | 296286 | 11/1991 |
| EP | 02/06756 | 6/1986 |
| EP | 206756 A2 | 12/1986 |
| EP | 255181 A1 | 2/1988 |
| EP | 342792 A1 | 11/1989 |
| EP | 397081 A2 | 5/1990 |
| EP | 400844 A1 | 5/1990 |
| EP | 341012 B1 | 12/1992 |
| EP | 959096 A1 | 11/1999 |
| EP | 1209170 A1 | 5/2002 |
| EP | 1489109 A2 | 12/2004 |
| GB | 1 159 368 | 4/1987 |
| GB | 2 184 738 A | 7/1987 |
| JP | 03287605 | 12/1991 |
| JP | 5-186513 | 7/1993 |
| JP | 2001172567 A | 6/2001 |
| WO | WO 90/05711 | 5/1990 |
| WO | WO 94/13706 | 6/1994 |
| WO | WO 97/19962 A1 | 6/1997 |
| WO | WO 99/09074 | 2/1999 |
| WO | WO 00/75202 A1 | 12/2000 |
| WO | WO 03/106390 A1 | 12/2003 |
| WO | WO 2004/048215 A2 | 6/2004 |
| WO | WO 2006/110647 A1 | 10/2006 |

OTHER PUBLICATIONS

International Preliminary Report on Patentability for PCT/US2009/048471, Jan. 5, 2011, p. 1-6.*

Bae et al., "The Role of Pyridine Derivatives in Living Carbocationic Polymerization: Lewis Base or Nucleophile", Macromol, Symp. vol. 132, 11-23, 1998.

Bae et al., Y. C. and Faust, R., "B-Proton Elimination by Free Bases in the Living Carbocationic Polymerization of Isobutylene", Macromolecules, 30, 7341-7344, 1997, vol. 30, No. 23, J. American Chemical Society.

Bauer et al., "Complexes of stannic chloride and alkyl phenols and the influence of these complexes and of free phenol on the cationic polymerization of isobutene", Can. J. Chem., 48, 1251, 1970.

Bauer et al., "Cationic polymerication of isobutene initiated by stannic chloride and phenols: polymer endgroup studies", J. Poly. Sci., A-1(9), 1451, 1971.

Bezumnova et al., "Reaction of 2-mercaptobenzothiazole with ethylenic hydrocarbons" (English abstract), Khim. Geterosikl. Soedin. 80, 194, 1971.

Boileau et al., "Reaction of functionalised thiols with oligoisobutenes via free-radical addition. Some new routes to thermoplastic crosslinkable polymers", European Polymer Journal, 39, 1395-1404, 2003.

Database WPI Section Ch. Week 197201 Derwent Publications Ltd. London, GB; AN 1972-00713T XP002316480—& SU 293 804 A (ND Zelinskii organic chem) Jan. 26, 1971 abstract.

De et al., "Carbocationic polymerization of isobutylene using methylaluminum bromide coinitiators: synthesis of bromoallyl functional polyisobutylene", Macromolecules, 39(22), 7527, 2006.

De et al., "Relative Reactivity of C4 olefins toward the polyisobutylene cation", Macromolecules, 39, 6861, 2006.

De et al., "Capping reactions in cationic polymerization: kinetic and synthetic utility", ACS Div. Polym. Chem., Polym. Preprs., 46, 847, 2005.

Diaz et al., "A Polymer Electrode with Variable Conductivity: polypyrrole", J. I. J. Chem. Soc., Chem. Comm, 397-398, 1980.

Diaz et al., "Electrochemical Polymerization of Pyrrole", J. Chem. Soc., Chem Comm., 635-636, 1979.

Evsyukov et al., "Chemical dehydrohalogenation of halogen-containing polymer". Russian Chemical Reviews, 60, 4, 1991.

Faust et al., "Living Carbocationic Polymerization. XXI. Kinetic and mechanistic studies of isobutylene polymerization initiated by trimethylpentyl esters of different acids", J. Macromol. Sci.—Chem., A27(6). 649-667, 1990.

Fodor et al., "Synthetic Applications of Non-Polymerizable Monomers in Living Carbocationic Polymerizations". ACS Div. Polym. Chem., Polym. Preprs., 35(2), 492-493, 1994.

Gardini, "The Oxidation of Monocyclic Pyrroles", Adv. Heterocyl. Chem 15(67), 67-99, 1973.

Gonzales de la Campa, J., Pham, Q. Makromol. Chem., 182, 1415, 1981 (English Abstract).

Gorski et al., "Functionalized polyisobutenes by SH-en addition", Die Angewandte Makromolekulare Chemie, 253, 51-64, 1997.

Hadjikyriacou et al., "Cationic Macromolecular Design and Synthesis Using Furan Derivatives", Macromolecules, 32, 6394-6399, 1999.

Hadjikyriacou et al., "Living Coupling Reaction in living cationic polymerization. 3. Coupling reaction of living polyisobutylene using bis(furanyl) derivatives", Macromolecules, 33, 730-733, 2000.

Hamley, Block Copolymers, Encyclopedia of Polymer Science and Technology, 457-482, Mar. 2002.

Higashihara et al., "Synthesis of Poly(isobutylene-block-methyl methzcrylate) by a novel coupling approach", Macromolecules, 39(16), 5275, 2006.

Ipatieff et al., "Reaction of Aliphatic Olefins with Thiophenol", J. Am. Chem. Soc. 60, 2731, 1938.

Ivan et al., "New telechelic polymers and sequential copolymers by polyfunctional initiator-transfer agents (inifers)", J. Poly. Chem. Ed., 18, 3177-3191, 1980.

Ivan et al., "Living carbocationic polymerization. XXX. One-pot synthesis of allyl-terminated linwar and tri-arm star polyisobutylenes, and epoxy-and hydroxy-telechelics therefrom", J. Polym. Sci.: Part A: Polym. Chem., 28, 89-104, 1990.

Kaszas et al., "Living carbocationic polymerization. Isobutylene polymerization in the presence of pyridine and various other electron donors", Polymer Bulletin (Berlin), 20(5), 413-19, 1988.

Keki et al., "Dimethyldioxirane as a New and Effective Oxidation Agent for the Epoxidation of a,w-Di(isobutenyl)polyisobutylene: A convenient Synthesis of a,w-Di(2-methyl-3-hydroxypropyl)-polyisobutylene", J. Poly. Sci. A Poly. Chem., 40, 3974-3986, 2002.

Kennedy et al., "New Telechelic Polymers and Sequential Copolymers by Polyfunctional Initiator-Transfer Agents (Inifers)", Polym. Bull., 9, 27-32, 1983.

Kennedy et al., "New Telechelic Polymers and Sequential Copolymers by Polyfunctional Initiator Transfer Agents (Inifers) V. Synthesis of a-tert-butyl-w-isopropenylopolyisobutylene and a,w-Di(isopropenyl)polyisobutylene", Polymer Bulletin, 1, 575-580, 1979.

Kennedy et al., "New Telechelic polymers and sequential Copolymers by Polyfunctional Initiator Transfer Agents (Inifers) 27 bisphenol and trisphenol polyisobutylenes", Poly. Bull., 8, 563-570, 1982.

Kennedy et al., "Living Carbocationic Polymerization. XXXIX. Isobutylene Polymerization in the Presence of Pyridine and Various Other Electron Donors", Journal of Macromolecular Science, Chemistry, A28(2), 197-207, 1991.

Kim et al., "Synthesis and Characterization of Novel Silicon-Functional Polyisobutylenes and Their Applications: Polyisobutylene Brushes on Silicate Substrates via Living Cationic Polymerization", Journal of Macromlecular Science Part A—Pure and Applied Chemistry. A40(10), 991-1008, 2003.

Klemm et al., "Untersuchungen zur Thioladdition an Polybutadiene", Angew Makromol. Chem., 207, 187, 1993 (English Abstract).

Klemm et al., "Unusual addition by the thiol-ene photopolymerization", Polym. Bull. (Berlin) 28, 653, 1992.

Koroskenyl et al., "Initiation via haloboration in living cationic polymerization. 6. A novel Method for the synthesis of primary amine functional polyisobutylenes", Pure Appl. Chem., A36(12), 1879-1893, 1999.

Lenz, "Organic Chemistry of Synthetic High Polymers," Section 7.2 Poly(alkylene Sulfides), Interscience Publishers, New York, p. 196, 1967.

Li et al., "Polyisobutylene supports—a non-polar hydrocarbon analog of PEG supports", Tetrahedron, 61, 12081-12092, 2005.

Machl et al., "Novel Synthetic Routes to Aminofunctionalized Polyisobutylenes", ACS Div. Polym. Chem. Polym. Preprs., 44(2), 858-859, 2003.

Maenz et al., "Investigation of the structure of low molecular weight polybutadienes and epoxides made therefrom", Acta Polymerica, 47(5), 208-213, 1996.

Maenz et al., "Macromonomers based on low-molecular-weight polyisobutenes", Angewandte Makromolekulare Chemie, 242, 183-197, 1996.

Maenz et al., "Comb-like polymers from macromonomers based on low-molecular weight poly(isobutene)s", Angewandte Makromolekulare Chemie, 258, 69-73, 1998.

Martinez-Castro et al., "Polyisobutylene Stars and Polyisobutylene-block-poly(tert-butyl methacrylate) block copolymers by site transformation of thiophene end-capped polyisobutylene chain ends", Macromolecules, 36, 6985-6994, 2003.

Mishra et al., "New telechelic polymers and sequential copolymers by polyfunctional initiator transfer agents (inifers) L1. Synthesis and characterization of anisole terminated polyisobutylenes", Poly. Bull., 16, 47-53, 1982.

Morgan et al., "Thiol/Ene Photocurable Polymers", J. Polym. Sci. Polym. Chem. Ed., 15, 627, 1977.

Nemes et al., "Oxyethylation and Carbonation of Telechelic Polyisobutylene Anions", Poly. Bull. 24, 187-194, 1990.

Nielsen et al., "Synthesis of isobutenyl-telechelic polyisobutylene by functionalization with isobutenyltrimethylsilane", Polymer, 38(10), 2529-2534, 1997, Elsevier Science Ltd.

Nuyken et al., "Novel sulfur containing polymers", Makromol. Chem. Macromol. Symp, 26, 313, 1989.

Nuyken et al., "Telechelics via addition of dithiols onto alkadienes, 1 Radical mechanism", Makromol. Chem. Rapid Commun. 11, 365, 1990.

Nuyken et al., Polym. Bull. (Berlin), 4, 61-65, 1981.

Puskas et al., "The Nature of the Double Bond in Low Molecular Weight Polyisobutylenes and Polybutene Copolymers", J. Polymer Sci: Symposium No. 56, 191, 1976.

Rooney, "Synthesis of Phenol-Terminated Polyisobuylene: competitive chain transfer reactions", J. Appl. Poly. Sci. , 25, 1365-1372, 1980.

Roth et al., "A Novel Method of the Determination of Propagation Rate Constants: Carbocationic Oligomerization of Isobutylene", Macromolecules, J. American Chemical Society, vol. 29, No. 19, 6104-6109, 1996.

Sawamoto et al., "End Functionalized Polymers by Living Cationic Polymerization", Macromolecules, 20(1), 1-6, 1987.

Schriescheim et al., "Industrial Friedel-Crafts chemistry: Past and future", Chemtech, 310, 1978.

Serniuk et al., "Study of the Reaction of Buna Rubbers of Aliphatic Mercaptans", J. Am. Chem. Soc. 70, 1804, 1948.

Si et al., "Living carbocationic polymerization. Narrow molecular weight distribution polyisobutylenes prepared by esters and ketones as electron donors", Polymer Bulletin (Berlin) 33(6), 651-6, 1994.

Simison et al., "End-Quenching of Quasiliving Carbocationic Isobutylene Polymerization with Hindered Bases: Quantitative Formation of exo-Olefin-Terminated Polyisobutylene". Macromolecules, 39, 2481-2487, 2006.

Stacey et al., Organic Reactions: vol. 13, pp. 150-208 and 233-333, 1963.

Storey et al., "N-methylpyrrole-terminated polyisobutylene through end-quenching of quasiliving carbocationic polymerization", Macromolecules, 38(11), 4618-4624, 2005.

Ummadisetty et al., "Rapid Communication: Quantitative Syntheses of Novel Polyisobutylenes Fitted with Terminal Primary -Br, -Oh, -NH2, and Methacrylate Termini", J. Poly. Sci. A Poly. Chem., 46, 4236-4242, 2008.

The University of Southern Mississippi, "Synthesis and Characterization of Novel Polyisobutylene Based Materials: Gradient Block Copolymers, Exo-olefins via in situ Quenching, and Carboxylic Acid Functional Telechelics", Dec. 2007.

Wallace et al., "Intelligent Polymer Systems". Encyclopedia of Polymer Science and Technology, 231-250, Jul. 2004.

Wollyung et al., "Intelligent Polymers Systems", J. Poly. Sci. A Poly. Chem., 43, 946-958, 2005.

Zhang et al., "Synthesis of Polyisobutylene with arylamino terminal group by combination of cationic polymerization with alkylation", Poly. Sci. A. Poly. Chem, 46, 936-946, 2008.

Zinger et al., "Timed Release of Chemicals from Polypyrrole Films", J. Am. Chem. Soc. vol. 106, No. 22, 6861-6863, 1984.

Notice of Allowance mailed Aug. 11, 2005, U.S. Appl. No. 10/600,898.

Office Action mailed Feb. 20, 2009, U.S. Appl. No. 11/186,157.

Office Action mailed Oct. 20, 2008, U.S. Appl. No. 11/186,157.

Office Action mailed Apr. 1, 2008, U.S. Appl. No. 11/186,157.

Notice of Allowance mailed Aug. 6, 2009, U.S. Appl. No. 11/207,264.

Office Action mailed Nov. 12, 2008, U.S. Appl. No. 11/207,264.

Notice of Allowance mailed Aug. 7, 2009, U.S. Appl. No. 11/207,366.

Office Action mailed Nov. 12, 2008, U.S. Appl. No. 11/207,366.

Office Action mailed Jan. 2, 2008, U.S. Appl. No. 11/207,377.

Office Action mailed Mar. 23, 2007, U.S. Appl. No. 11/207,377.

Office Action mailed Aug. 31, 2009, U.S. Appl. No. 11/356,490.

Office Action mailed Jan. 8, 2009, U.S. Appl. No. 11/356,490.

Notice of Allowance mailed Dec. 3, 2008, U.S. Appl. No. 11/356,491.

Office Action mailed May 13, 2008, U.S. Appl. No. 11/356,491.

Office Action mailed Dec. 5, 2008, U.S. Appl. No. 11/357,562.

Office Action mailed Aug. 7, 2009, U.S. Appl. No. 11/357,562.
U.S. Appl. No. 12/055,281, filed Mar. 25, 2008.
Bin Cheng et al., "Study of the interactions of organic sulfides with active species in the cationic polymerization of 1,3-pentadiene", Polymer Bulletin 51(5-6), 343-349, Apr. 2004.
DePuy et al., "Electronic Effects in Elimination Reactions, V. The E2 Reaction of b-Phenylethyl Fluorides and Chlorides", J. Am. Chem. Soc., 82(10), 2535-3537, 1960.
Faust et al., "Living Carbocationic Polymerization. IV. Living Polymerization of Isobutylene", J. Polym. Sci. A Polym. Chem. 25, 1847-1864, 1986.
Kaszas et al., "Electron Pair Donors in Carbocationic Polymerization. 2. Mechanism of Living Carbocationic Polymerizations and the Role of in Situ and External Electron Pair Donors", Macromolecules 23, 3909-3915, 1990.
Kennedy et al., "New Telechelic Polymers and Sequential Copolymers By Polyfunctional Initiator-Transfer Agents, (Inifers) 10. Three-Arm Star Telechelic Polyisobutylenes Carrying Chlorine, Olefin or Primary Alcohol Endgroups", Polym. Bull. 4, 67-74, 1981.
Kennedy et al., "New Telechelic Polymers and Sequential Copolymers By Polyfunctional Initiator-Transfer Agents, I.", Polym. Prepr. (Am. Chem. Soc., Div. Polym. Chem.) 20(2), 316, 1979.
Kennedy et al., "New Telechelic Polymers and Sequential Copolymers By Polyfunctional Initiator-Transfer Agents, II.", J. Polym. Sci., Polym. Chem. Ed., 18, 1523, 1980.
Mishra et al., "Living Carbocationic Polymerization, VIII.", J. P. Polym. Bull. 17, 7-13, 1987.
Odian, Principles of Polymerization, 4th ed., Wiley, Chapter 8.
Pernecker et al., "Living Carbocationic Polymerization, XLVI. Living isobutylene polymerization induced by the common ion effect", Polym. Bull. 26, 305-312, 1991.

Puskas et al., "Investigation of the Effect of Epoxide Structure on the Initiation Efficiency in Isobutylene Polymerizations Initiated by Epoxide/TiCl$_4$ Systems", Euro. Polymer Journal 39: 2147-2153, 2003.
Sita et al., "Amidinate-based catalysts for stereoselective living ziegler-natta polymerizations", Abstracts of Papers of the American Chemical Society, vol. 224, Part 2, pp. U502-U502, 2002.
Stacey et al., Organic Reactions: vol. 13, pp. 150-208 and 233-233, 1963.
Storey et al., "Mechanistic Role of Lewis Bases and Other Additives in Quasiliving Carbocationic Polymerization of Isobutylene", Macromolecules 34, 5416-5432, 2001.
Notice of Allowance mailed Dec. 10, 2009, U.S. Appl. No. 11/207,264.
Notice of Allowance mailed Dec. 15, 2009, U.S. Appl. No. 11/207,366.
Supplemental Notice of Allowance mailed Apr. 2, 2010, U.S. Appl. No. 11/207,366.
Notice of Allowance mailed Apr. 28, 2010, U.S. Appl. No. 11/356,490.
Final Office Action mailed Apr. 2, 2010, U.S. Appl. No. 11/357,562.
Notice of Allowance mailed Apr. 15, 2011, U.S. Appl. No. 11/357,562.
Office Action mailed Jun. 11, 2010, U.S. Appl. No. 12/055,281.
Final Office Action mailed Jan. 21, 2011, U.S. Appl. No. 12/055,281.
Supplemental Final Office Action and Interview Summary mailed Apr. 29, 2011, U.S. Appl. No. 12/055,281.

* cited by examiner

PREPARATION OF EXO-OLEFIN TERMINATED POLYOLEFINS VIA QUENCHING WITH ALKOXYSILANES OR ETHERS

1. FIELD

Provided herein are methods for preparing exo-olefin terminated polyolefins.

2. BACKGROUND

Exo-olefin terminated polyolefins, such as polyisobutylene (PIB), are useful precursors for the preparation of polymers containing specific functional end groups. Specifically, exo-olefin end groups may be transformed into other specific functional end groups. Polymers containing specific end groups have several useful purposes. For example, PIB-based succinimido amine dispersants are useful as engine lubricants. Thus, there is a need for methods of selectively or exclusively producing exo-olefin terminated polyolefins.

3. SUMMARY

In one embodiment, provided herein are methods for preparing a polyolefin containing one or more exo-olefinic end groups on the polyolefin chain, comprising quenching an ionized polyolefin with an alkoxysilane or an ether. In some embodiments, the method is represented by the following scheme:

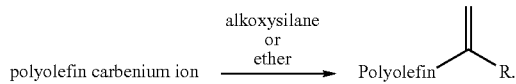

wherein R is hydrogen or hydrocarbyl. In some embodiments, R is hydrocarbyl.

In some embodiments, the alkoxysilane or ether compound has the formula:

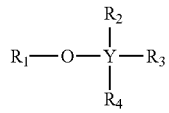

wherein Y is carbon or silicon;
$R_1$ is hydrocarbyl and $R_2$-$R_4$ are each, independently, H or hydrocarbyl.

In some embodiments, the polyolefin containing one or more exo-olefinic end groups formed is at least 98 percent by mole of all products.

4. DETAILED DESCRIPTION

4.1 Definitions

Unless defined otherwise, all technical and scientific terms used herein have the same meaning as is commonly understood by one of ordinary skill in the art. In the event that there are a plurality of definitions for a term used herein, the definitions provided in this section prevail unless stated otherwise.

As used herein, "alcohol" refers to a compound of formula:

R—OH wherein R is aliphatic hydrocarbyl, and the —OH may be attached to a primary, secondary, or tertiary carbon.

As used herein, "alkyl" refers to a carbon chain or group containing from 1 to 20 carbons, or 1 to 16 carbons. Such chains or groups may be straight or branched. Exemplary alkyl groups herein include, but are not limited to, methyl, ethyl, propyl, isopropyl, isobutyl, n-butyl, sec-butyl, tert-butyl, isopentyl, neopentyl, tert-pentyl, or isohexyl. As used herein, "lower alkyl" refers to carbon chains or groups having from 1 carbon atom to about 6 carbon atoms.

As used herein, "alkenyl" refers to a carbon chain or group containing from 2 to 20 carbons, or 2 to 16 carbons, wherein the chain contains one or more double bonds. An example includes, but is not limited to, an allyl group. The double bond of an alkenyl carbon chain or group may be conjugated to another unsaturated group. An alkenyl carbon chain or group may be substituted with one or more heteroatoms. An alkenyl carbon chain or group may contain one or more triple bonds.

As used herein, "alkynyl" refers to a carbon chain or group containing from 2 to 20 carbons, or 2 to 16 carbons, wherein the chain contains one or more triple bonds. An example includes, but is not limited to, a propargyl group. The triple bond of an alkynyl carbon chain or group may be conjugated to another unsaturated group. An alkynyl carbon chain or group may be substituted with one or more heteroatoms. An alkynyl carbon chain or group may contain one or more double bonds.

As used herein, "aryl" refers to a monocyclic or multicyclic aromatic group containing from 6 to about 30 carbon atoms. Aryl groups include, but are not limited to, groups such as unsubstituted or substituted fluorenyl, unsubstituted or substituted phenyl, or unsubstituted or substituted naphthyl.

As used herein, "alkaryl" refers to an aryl group substituted with at least one alkyl, alkenyl, or alkynyl group.

As used herein, "aralkyl" refers to an alkyl, alkenyl, or alkynyl group substituted with at least one aryl group.

As used herein, "alkoxysilane" refers to a compound containing at least one silicon atom bonded to at least one alkoxy group.

As used herein, "amine" refers to a compound of formula:

$R_3$—$NR_1R_2$ wherein $R_1$, $R_2$, and $R_3$ are each, independently, hydrogen or hydrocarbyl.

As used herein, "carbocation" and "carbenium ion" refer to a positively charged carbon atom.

As used herein, "carbocation terminated polyolefin" refers to a polyolefin containing at least one carbocation end group. Examples include, but are not limited to, compounds of the formula:

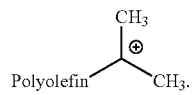

As used herein, "chain end concentration" refers to the sum of the molar concentration of carbocationic end groups and dormant end groups. When a mono-functional initiator is used, the chain end concentration is approximately equal to the initiator concentration. For a multi-functional initiator, when the functionality of the initiator equals x, then the chain end concentration is approximately equal to x times the initiator concentration.

As used herein, "coupled polyolefin" refers to the product of the addition of a carbocation terminated polyolefin to another polyolefin.

As used herein, "diluent" refers to a liquid diluting agent or compound. Diluents may be a single compound or a mixture of two or more compounds. Diluents may completely dissolve or partially dissolve the reaction components. Examples include, but are not limited to, hexane or methyl chloride, or mixtures thereof.

As used herein, "electron donor" refers to a molecule that is capable of donating a pair of electrons to another molecule. Examples include, but are not limited to, molecules capable of complexing with Lewis acids. Further examples include, but are not limited to, bases and/or nucleophiles. Further examples include, but are not limited to, molecules capable of abstracting or removing a proton. Further examples include, but are not limited to, pyridine derivatives.

As used herein, "ether" refers to a compound of the formula:

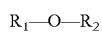

wherein $R_1$ and $R_2$ are each, independently, hydrocarbyl.

As used herein "exo-olefin end group" or "exo-olefinic end group" refers to a terminal olefin moiety.

As used herein, "exo-olefin terminated polyolefin" refers to a polyolefin that contains at least one exo-olefin end group. Examples include, but are not limited to, compounds of the following formula:

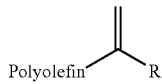

wherein R is hydrogen or hydrocarbyl. In some embodiments, R is hydrocarbyl.

As used herein, "halide, "halo," or "halogen" refers to F, Cl, Br, or I.

As used herein, "hydrocarbyl" refers to a monovalent, linear, branched or cyclic group which contains only carbon and hydrogen atoms.

As used herein, "initiator" refers to a compound that provides a carbocation. Examples include, but are not limited to, compounds with one or more carbocation precursor groups. An initiator may be mono-functional or multi-functional. As used herein, "mono-functional initiator" refers to an initiator that provides approximately one stoichiometric equivalent of carbocation relative to initiator. As used herein, "multi-functional initiator" refers to an initiator that provides approximately x stoichiometric equivalents of carbocation relative to initiator, wherein x represents the functionality of the initiator. When a mono-functional initiator is used, the chain end concentration is approximately equal to the initiator concentration. For a multi-functional initiator, when the functionality of the initiator equals x, then the chain end concentration equals x times the initiator concentration.

As used herein, "ionized polyolefin" refers to a polyolefin containing at least one carbenium ion. An example includes, but is not limited to, a tert-halide terminated polyolefin that has been ionized into a cationic polyolefin. A further example includes, but is not limited to, a quasiliving carbocationic polyolefin. A further example includes, but is not limited to, an exo-olefin terminated polyolefin that has been ionized into an ionized polyolefin or quasiliving carbocationic polyolefin. A further example includes, but is not limited to, a polyolefin containing an olefin that has been ionized into a quasiliving carbocationic polyolefin or a cationic polyolefin.

As used herein, "Lewis acid" refers to a chemical entity that is capable of accepting a pair of electrons. An example includes, but is not limited to, titanium tetrachloride.

As used herein, "monomer" refers to an olefin that is capable of combining with a carbocation to form another carbocation. An example includes, but is not limited to, isobutylene.

As used herein, "percent by mole of all products" refers to the proportion of the number of moles of a particular product of a reaction to the number of moles of all products of the reaction multiplied by one hundred.

As used herein, "polyolefin" refers to a polymer that comprises at least two olefin monomers. An example includes, but is not limited to, polyisobutylene.

As used herein, "pyridine derivative" refers to a compound of the formula:

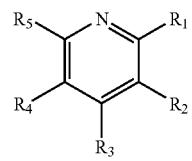

wherein $R_1$, $R_2$, $R_3$, $R_4$, and $R_5$ are each, independently, hydrogen or hydrocarbyl; or $R_1$ and $R_2$, or $R_2$ and $R_3$, or $R_3$ and $R_4$, or $R_4$ and $R_1$ independently form a fused aliphatic ring of about 4 to about 7 carbon atoms or a fused aromatic ring of about 5 to about 7 carbon atoms. An example includes, but is not limited to, 2,6-lutidine.

As used herein, "quasiliving carbocationic polymerization conditions" refers to polymerization conditions that allow for the formation of quasiliving carbocationic polyolefins.

As used herein, "quasiliving carbocationic polyolefin" refers to a carbocationic polyolefin that has been formed under quasiliving polymerization conditions and is active in propagation in the presence of olefinic monomer.

As used herein, "quasiliving polymerization" refers to a carbocationic polymerization in which the rate of irreversible chain-breaking reactions is either zero or very low relative to the rate of propagation. Quasiliving polymerization proceeds by initiation and is followed by propagation, wherein propagating (active) polymer chains are in rapid equilibrium with non-propagating (dormant) polymer chains.

As used herein, "quasiliving polymerization conditions" refers to reaction conditions that allow quasiliving polymerization to occur.

As used herein, "quenching" refers to reacting a carbenium ion with a quenching agent.

As used herein, "quenching agent" refers to a compound that can, either alone or in combination with another compound, react with a carbenium ion.

As used herein, "terminator" refers to a compound that terminates polymerization via deactivation of the Lewis acid.

As used herein, "tert-halide terminated polyolefin" refers to a polyolefin that contains at least one tertiary halide end group. An example includes, but is not limited to, a compound of formula:

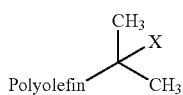

wherein X is a halogen.

4.2 Methods

Provided herein are methods for preparing a polyolefin containing one or more exo-olefinic end groups on the polyolefin chain, comprising quenching an ionized polyolefin with an alkoxysilane or an ether. In some embodiments, the polyolefin prepared by the methods provided herein contains one exo-olefinic end group on the polyolefin chain. In some embodiments, the polyolefin prepared by the methods provided herein contains more than one exo-olefinic end group on the polyolefin chain. In some embodiments, the method is represented by the following scheme:

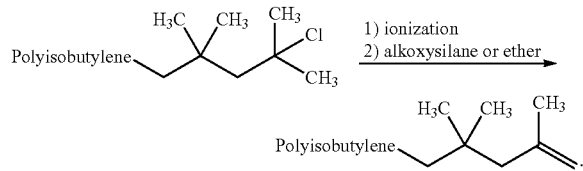

In some embodiments, the method is performed in a diluent. In some embodiments, multiple alkoxysilanes are used. In some embodiments, multiple ethers are used.

In some embodiments of the methods described herein, the quenching agent is an alkoxysilane or an ether. Without being limited to any theory, in some embodiments, the quenching agent is a complex formed between two compounds or atoms.

Without being limited to any theory, in some embodiments, the quenching agent is a complex between the alkoxysilane and a Lewis acid. Without being limited to any theory, in some embodiments, the quenching agent is a complex between the alkoxysilane and a titanium tetrahalide. Without being limited to any theory, in some embodiments, the quenching agent is a complex between the alkoxysilane and titanium tetrachloride. Without being limited to any theory, in some embodiments, the quenching agent is a complex between allyloxytrimethylsilane, ethoxytrimethylsilane, or methoxytrimethylsilane and a Lewis acid. Without being limited to any theory, in some embodiments, the quenching agent is a complex between allyloxytrimethylsilane, ethoxytrimethylsilane, or methoxytrimethylsilane, and a titanium tetrahalide. Without being limited to any theory, in some embodiments, the quenching agent is a complex between allyloxytrimethylsilane, ethoxytrimethylsilane, or methoxytrimethylsilane, and titanium tetrachloride. Without being limited to any theory, in some embodiments, the quenching agent is a complex between ethoxytrimethylsilane and titanium tetrachloride. Without being limited to any theory, in some embodiments, the quenching agent is a 1:1 stoichiometric complex between an alkoxysilane and a Lewis acid. Without being limited to any theory, in some embodiments, the quenching agent is a 1:1 stoichiometric complex between an alkoxysilane and a titanium tetrahalide. Without being limited to any theory, in some embodiments, the quenching agent is a 1:1 stoichiometric complex between an alkoxytrimethylsilane and titanium tetrachloride. Without being limited to any theory, in some embodiments, the quenching agent is a 1:1 stoichiometric complex between ethoxytrimethylsilane and titanium tetrachloride. Without being limited to any theory, in some embodiments, the quenching agent is a compound of the following formula:

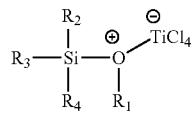

wherein $R_1$-$R_4$ are hydrocarbyl.

Without being limited to any theory, in some embodiments, the quenching agent is the following compound:

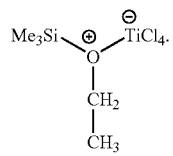

Without being limited to any theory, in some embodiments, the quenching agent is the alkoxysilane. Without being limited to any theory, in some embodiments, the quenching agent is allyloxytrimethylsilane, ethoxytrimethylsilane, or methoxytrimethylsilane.

Without being limited to any theory, in some embodiments, the quenching agent is a complex between the ether and Lewis acid. Without being limited to any theory, in some embodiments, the quenching agent is a complex between the ether and a titanium tetrahalide. Without being limited to any theory, in some embodiments, the quenching agent is a complex between the ether and titanium tetrachloride. Without being limited to any theory, in some embodiments, the quenching agent is a complex between tert-butyl ethyl ether or tert-butyl methyl ether and a titanium tetrahalide. Without being limited to any theory, in some embodiments, the quenching agent is a complex between tert-butyl ethyl ether or tert-butyl methyl ether and titanium tetrachloride.

Without being limited to any theory, in some embodiments, more than one quenching agent act to quench the carbenium ion. For example, in the case of an alkoxysilane, the carbenium ion may be quenched with a mix of free alkoxysilane and complexed alkoxysilane.

Without being limited to any theory, in some embodiments, an electron donor is the quenching agent. Without being limited to any theory, in some embodiments, a pyridine derivative is the quenching agent. Without being limited to any theory, in some embodiments, 2,6-lutidine is the quenching agent.

In some embodiments, the quenching time is from about 1 minute to about 90 minutes. In some embodiments, the quenching time is greater than 60 minutes. In some embodiments, the quenching time is about 5 minutes. In some embodiments, the quenching time is about 10 minutes. In some embodiments, the quenching time is about 15 minutes. In some embodiments, the quenching time is about 20 minutes. In some embodiments, the quenching time is about 25 minutes. In some embodiments, the quenching time is about 30 minutes. In some embodiments, the quenching time is about 35 minutes. In some embodiments, the quenching time is about 40 minutes. In some embodiments, the quenching time is about 45 minutes. In some embodiments, the quenching time is about 50 minutes. In some embodiments, the quenching time is about 55 minutes. In some embodiments, the quenching time is about 60 minutes.

In some embodiments, the reaction is quenched at a temperature from about −150° C. to about −30° C. In some embodiments, the reaction is quenched at a temperature from about −150° C. to about −40° C. In some embodiments, the reaction is quenched at a temperature from about −100° C. to about −30° C. In some embodiments, the reaction is quenched at a temperature from about −100° C. to about −40° C. In some embodiments, the reaction is quenched at a temperature from about −90° C. to about −60° C. In some embodiments, the reaction is quenched at a temperature of about −100° C. In some embodiments, the reaction is quenched at a temperature of about −90° C. In some embodiments, the reaction is quenched at a temperature of about −80° C. In some embodiments, the reaction is quenched at a temperature of about −70° C. In some embodiments, the reaction is quenched at a temperature of about −60° C. In some embodiments, the reaction is quenched at a temperature of about −55° C. In some embodiments, the reaction is quenched at a temperature of about −50° C. In some embodiments, the reaction is quenched at a temperature of about −45° C. In some embodiments, the reaction is quenched at a temperature of about −40° C. In some embodiments, the reaction is quenched at a temperature of about −35° C. In some embodiments, the reaction is quenched at a temperature of about −30° C.

In some embodiments, the reaction mixture and isolated polyolefin products are largely free of colored precipitates.

4.2.1 Quenching Agents

Various embodiments of the quenching agents for use herein are described herein. All combinations of such embodiments are within the scope of this disclosure.

(a) Alkoxysilanes

In some embodiments, the alkoxysilane has the formula:

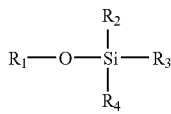

wherein $R_1$ is hydrocarbyl; and $R_2$-$R_4$ are each, independently, hydrogen or hydrocarbyl.

In some embodiments, the alkoxysilane has the formula:

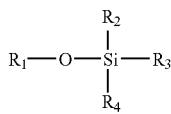

wherein:

$R_1$ is alkyl, alkenyl, alkynyl, aryl, alkaryl, or aralkyl; and
$R_2$, $R_3$, and $R_4$ are each, independently, hydrogen, alkyl, alkenyl, alkynyl, aryl, alkaryl, or aralkyl, or $R_2$ and $R_3$, or $R_2$ and $R_4$ or $R_3$ and $R_4$ independently form a fused aliphatic ring of about 3 to about 7 carbon atoms.

In some embodiments, $R_1$ is alkyl, alkenyl, alkynyl, aryl, alkaryl, or aralkyl. In some embodiments, $R_1$ is alkyl, alkenyl, alkynyl, or aralkyl. In some embodiments, $R_1$ is alkyl, alkenyl, or alkynyl. In some embodiments, $R_1$ is alkyl. In some embodiments, $R_1$ is lower alkyl.

In some embodiments, $R_1$ is methyl, ethyl, or allyl. In some embodiments, $R_1$ is methyl. In some embodiments, $R_1$ is ethyl. In some embodiments, $R_1$ is allyl.

In some embodiments, $R_2$, $R_3$, and $R_4$ are each, independently, hydrogen, alkyl, alkenyl, alkynyl, aryl, alkaryl, or aralkyl, or $R_2$ and $R_3$, or $R_2$ and $R_4$, or $R_3$ and $R_4$ independently form a fused aliphatic ring of about 3 to about 7 carbon atoms. In some embodiments, $R_2$, $R_3$, and $R_4$ are each, independently, hydrogen, alkyl, alkenyl, alkynyl, or aralkyl, or $R_2$ and $R_3$, or $R_2$ and $R_4$, or $R_3$, and $R_4$ independently form a fused aliphatic ring of about 3 to about 7 carbon atoms. In some embodiments, $R_2$, $R_3$, and $R_4$ are each, independently, hydrogen, alkyl, alkenyl, or alkynyl. In some embodiments, $R_2$, $R_3$, and $R_4$ are each, independently, hydrogen or alkyl. In some embodiments, $R_2$, $R_3$, and $R_4$ are each, independently, alkyl. In some embodiments, $R_2$, $R_3$, and $R_4$ are each, independently, lower alkyl. In some embodiments, $R_2$, $R_3$, and $R_4$ are each methyl. In some embodiments, $R_2$, $R_3$, and $R_4$ are each hydrogen. In some embodiments, one of $R_2$-$R_4$ is hydrogen, and the other two are both methyl.

In some embodiments, the alkoxysilane is a monoalkoxysilane, dialkoxysilane, trialkoxysilane, or tetraalkoxysilane. In some embodiments, the alkoxysilane is a monoalkoxytrialkylsilane, dialkoxydialkylsilane, trialkoxymonoalkylsilane, or a tetraalkoxysilane. In some embodiments, the alkoxysilane is a monoalkoxytrialkylsilane or dialkoxydialkylsilane. In some embodiments, the alkoxysilane is a monoalkoxytrialkylsilane. In some embodiments, the alkoxysilane is a monoalkoxytrimethylsilane, monoalkoxytripropylsilane, or monoalkoxytributylsilane. In some embodiments, the alkoxysilane is a monoalkoxytrimethylsilane.

In some embodiments, the alkoxysilane is allyloxytrimethylsilane, ethoxytrimethylsilane, or methoxytrimethylsilane. In some embodiments, the alkoxysilane is allyloxytrimethylsilane. In some embodiments, the alkoxysilane is ethoxytrimethylsilane. In some embodiments, the alkoxysilane is methoxytrimethylsilane.

(b) Ethers

In some embodiments, the ether has the formula:

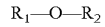

wherein $R_1$ and $R_2$ are each, independently, hydrocarbyl.

In some embodiments, the ether has the formula:

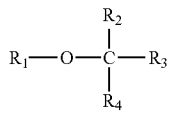

wherein $R_1$ is hydrocarbyl and $R_2$-$R_4$ are each, independently, hydrogen or hydrocarbyl.

In some embodiments, the ether has the formula:

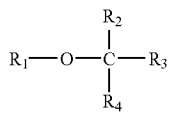

wherein:

$R_1$ is alkyl, alkenyl, alkynyl, aryl, alkaryl, or aralkyl; and
$R_2$, $R_3$, and $R_4$ are each, independently, hydrogen, alkyl, alkenyl, alkynyl, aryl, alkaryl, or aralkyl, or $R_2$ and $R_3$, or $R_2$ and $R_4$, or $R_3$ and $R_4$ independently form a fused aliphatic ring of about 3 to about 7 carbon atoms.

In some embodiments, $R_1$ is alkyl, alkenyl, alkynyl, aryl, alkaryl, or aralkyl. In some embodiments, $R_1$ is alkyl, alkenyl, alkynyl, or aralkyl. In some embodiments, $R_1$ is alkyl, alkenyl, or alkynyl. In some embodiments, $R_1$ is alkyl. In some embodiments, $R_1$ is lower alkyl. In some embodiments, $R_1$ is methyl, ethyl, or allyl. In some embodiments, $R_1$ is methyl. In some embodiments, $R_1$ is ethyl. In some embodiments, $R_1$ is allyl.

In some embodiments, $R_2$, $R_3$, and $R_4$ are each, independently, hydrogen, alkyl, alkenyl, alkynyl, aryl, alkaryl, or aralkyl, or $R_2$ and $R_3$, or $R_2$ and $R_4$, or $R_3$ and $R_4$ independently form a fused aliphatic ring of about 3 to about 7 carbon atoms. In some embodiments, $R_2$, $R_3$, and $R_4$ are each, independently, hydrogen, alkyl, alkenyl, alkynyl, or aralkyl, or $R_2$ and $R_3$, or $R_2$ and $R_4$, or $R_3$ and $R_4$ independently form a fused aliphatic ring of about 3 to about 7 carbon atoms. In some embodiments, $R_2$, $R_3$, and $R_4$ are each, independently, hydrogen, alkyl, alkenyl, or alkynyl. In some embodiments, $R_2$, $R_3$, and $R_4$ are each, independently, hydrogen or alkyl. In some embodiments, $R_2$, $R_3$, and $R_4$ are each, independently, alkyl. In some embodiments, $R_2$, $R_3$, and $R_4$ are each, independently, lower alkyl. In some embodiments, $R_2$, $R_3$, and $R_4$ are each methyl. In some embodiments, $R_2$, $R_3$, and $R_4$ are each hydrogen.

In some embodiments, the ether is an isopropyl alkyl ether, a sec-butyl alkyl ether, an isobutyl alkyl ether, or a tert-butyl alkyl ether. In some embodiments, the ether is a dialkyl ether. In some embodiments, the ether is diethyl ether or dipropyl ether. In some embodiments, the ether is a tert-butyl alkyl ether.

In some embodiments, the ether is tert-amyl methyl ether, isopropyl methyl ether, isopropyl ethyl ether, sec-butyl methyl ether, sec-butyl ethyl ether, isobutyl methyl ether, isobutyl ethyl ether, tert-butyl methyl ether, or tert-butyl ethyl ether. In some embodiments, the ether is tert-butyl ethyl ether or tert-butyl methyl ether. In some embodiments, the ether is tert-butyl ethyl ether. In some embodiments, the ether is tert-butyl methyl ether.

4.2.2 Ionized Polyolefins

Ionized polyolefins may be made by any method known to those of skill in the art. Examples include, but are not limited to, ionizing a tert-halide with a Lewis acid; ionizing a preformed polyolefin with a Lewis acid; or polymerizing an olefin monomer under quasiliving carbocationic polymerization conditions.

In some embodiments, the ionized polyolefin is a carbocation terminated polyolefin. In some embodiments, the ionized polyolefin contains one or more carbocation end groups. In some embodiments, the ionized polyolefin contains one carbocation end group. In some embodiments, the ionized polyolefin contains two carbocation end groups. In some embodiments, the ionized polyolefin contains three carbocation end groups. In some embodiments, the ionized polyolefin is a polyisobutylene with a cationic end group. In some embodiments, the ionized polyolefin is a compound of the following formula:

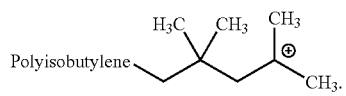

(a) Ionized Polyolefins from Tert-Halides

In some embodiments, the ionized polyolefin is derived from a tert-halide terminated polyolefin. In some embodiments, the ionized polyolefin is derived form a tert-chloride terminated polyolefin, tert-bromide terminated polyolefin, or tert-iodide terminated polyolefin. In some embodiments, the ionized polyolefin is derived from a tert-chloride terminated polyolefin or tert-bromide terminated polyolefin. In some embodiments, the ionized polyolefin is derived from a tert-chloride polyolefin.

In some embodiments, the ionized polyolefin is generated by contacting a tert-halide terminated polyolefin with a Lewis acid. In some embodiments, the ionized polyolefin is generated by contacting a tert-chloride terminated polyolefin, tert-bromide terminated polyolefin, or tert-iodide terminated polyolefin with a Lewis acid. In some embodiments, the ionized polyolefin is generated by contacting a tert-chloride terminated polyolefin with a Lewis acid.

In some embodiments, such Lewis acid is a non-protic acid. In some embodiments, such Lewis acid is a metal halide or non-metal halide. In some embodiments, such Lewis acid is a metal halide. In some embodiments, such Lewis acid is a titanium (IV) halide, a zinc (II) halide, a tin (IV) halide, or an aluminum (III) halide. In some embodiments, such Lewis acid is a titanium (IV) halide. In some embodiments, such Lewis acid is a tin (IV) halide. In some embodiments, such Lewis acid an aluminum (III) halide. In some embodiments, such Lewis acid is titanium tetrabromide or titanium tetrachloride. In some embodiments, such Lewis acid is titanium tetrachloride. In some embodiments, such Lewis acid is zinc chloride. In some embodiments, such Lewis acid is ethyl aluminum dichloride. In some embodiments such Lewis acid is a non-metal halide. In some embodiments, the Lewis acid is an antimony (VI) halide, a gallium (III) halide, or a boron (III) halide. In some embodiments, the Lewis acid is boron trichloride.

(b) Ionized Polyolefins from Preformed Polyolefins

In some embodiments, the ionized polyolefin is a preformed polyolefin. In some embodiments, such preformed polyolefin contains one or more double bonds. In some embodiments, such preformed polyolefin contains one double bond. In some embodiments, such preformed polyolefin is a polyisobutylene derivative. In some embodiments, such preformed polyolefin contains one or more endo olefins.

In some embodiments, the ionized polyolefin is generated by contacting a Lewis acid with a preformed polyolefin. In some embodiments, the ionized polyolefin is generated by contacting a preformed polyolefin containing one or more double bonds with a Lewis acid. In some embodiments, the ionized polyolefin is generated by contacting a preformed polyolefin containing one double bond with a Lewis acid. In some embodiments, the ionized polyolefin is generated by contacting a polyisobutylene derivative with a Lewis acid. In some embodiments, the ionized polyolefin is generated by contacting a preformed polyolefin containing one or more endo olefins with a Lewis acid.

(c) Ionized Polyolefins from Olefinic Monomers Under Quasiliving Carbocationic Polymerization Conditions In some embodiments, the ionized polyolefin is derived from olefinic monomers under quasiliving carbocationic conditions. Under such conditions, a quasiliving carbocationic polyolefin is generated. Such conditions may be achieved by any method known to those of skill in the art. In some embodiments, a monomer, an initiator, and a Lewis acid are used. In some embodiments, the ionized polyolefin is a quasiliving carbocationic polyisobutylene. In some embodiments, such quasiliving carbocationic polyolefin is a compound of the following formula:

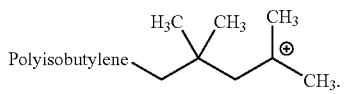

(i) Initiators

In some embodiments, the initiator is a compound or polyolefin with one or more tertiary end groups. In some embodiments, the initiator has one tertiary end group. In some embodiments, the initiator has more than one tertiary end group.

In some embodiments, the initiator is a compound of formula $(X'-CR_aR_b)_nR_c$ wherein $R_a$, $R_b$ and $R_c$ independently comprise at least one of alkyl, aromatic, alkyl aromatic groups, and can be the same or different, and X' is an acetate, etherate, hydroxyl group, or a halogen. In some embodiments, $R_c$ has a valence of n, and n is an integer of one to 4. In some embodiments, $R_a$, $R_b$ and $R_c$ are hydrocarbon groups containing one carbon atom to about 20 carbon atoms. In some embodiments, $R_a$, $R_b$ and $R_c$ are hydrocarbon groups containing one carbon atom to about 8 carbon atoms. In some embodiments, X' is a halogen. In some embodiments, X' is chloride. In some embodiments, the structure of $R_a$, $R_b$ and $R_c$ mimics the growing species or monomer. In some embodiments, such structure is a 1-phenylethyl derivative for polystyrene or a 2,4,4-trimethyl pentyl derivative for polyisobutylene. In some embodiments, the initiator is a cumyl, dicumyl or tricumyl halide. In some embodiments, chlorides are used. In some embodiments, the initiator is 2-chloro-2-phenylpropane, i.e., cumyl chloride; 1,4-di(2-chloro-2-propyl)benzene, i.e., di(cumylchloride); 1,3,5-tri(2-chloro-2-propyl)benzene, i.e., tri(cumylchloride); 2,4,4-trimethyl-2-chloropentane; 2-acetyl-2-phenylpropane, i.e., cumyl acetate; 2-propionyl-2-phenylpropane, i.e., cumyl propionate; 2-methoxy-2-phenylpropane, i.e., cumylmethyl ether; 1,4-di(2-methoxy-2-propyl)benzene, i.e., di(cumylmethyl ether); or 1,3,5-tri(2-methoxy-2-propyl)benzene, i.e., tri (cumylmethyl ether). In some embodiments, the initiator is 2-chloro-2,4,4-trimethylpentane (TMPCl), 1,3-di(2-chloro-2-propyl)benzene, 1,3,5tri(2-chloro-2-propyl)benzene, or 1,3,-di(2-chloro-2-propyl)-5-tert-butylbenzene (bDCC).

In some embodiments, the initiator is mono-functional, bi-functional, or multi-functional. In some embodiments, the initiator is mono-functional. In some embodiments, the initiator is 2-chloro-2-phenylpropane, 2-acetyl-2-phenylpropane, 2-propionyl-2-phenylpropane, 2-methoxy-2-phenylpropane, 2-ethoxy-2-phenylpropane, 2-chloro-2,4,4-trimethylpentane, 2-acetyl-2,4,4,-trimethylpentane, 2-propionyl-2,4,4-trimethylpentane, 2-methoxy-2,4.4-trimethylpentane, or 2-ethoxy-2,4,4-trimethylpentane. In some embodiments, the initiator is 2-chloro-2,4,4-trimethylpentane.

In some embodiments, the initiator is bi-functional. In some embodiments, the initiator is 1,3-di(2-chloro-2-propyl) benzene, 1,3-di(2-methoxy-2-propyl)benzene, 1,4-di(2-chloro-2-propyl)benzene, 1,4-di(2-methoxy-2-propyl)benzene, or 5-tert-butyl-1,3,-di(2-chloro-2-propyl) benzene. In some embodiments, the initiator is 5-tert-butyl-1,3,-di(2-chloro-2-propyl) benzene.

In some embodiments, the initiator is multi-functional. In some embodiments, the initiator is 1,3,5-tri(2-chloro-2-propyl)benzene or 1,3,5-tri(2-methoxy-2-propyl)benzene.

(ii) Monomers

In some embodiments, the monomer is a hydrocarbon monomer, i.e., a compound containing only hydrogen and carbon atoms, including but not limited to, olefins and diolefins, and those having from about 2 to about 20 carbon atoms. In some embodiments, such compounds have from about 4 to about 8 carbon atoms.

In some embodiments, the methods described herein can be employed for the polymerization of such monomers to produce polymers of different molecular weights. In some embodiments, the methods described herein can be employed for the polymerization of such monomers to produce polymers of different, but uniform molecular weights. In some embodiments, such molecular weight is from about 300 to in excess of a million g/mol. In some embodiments, such polymers are low molecular weight liquid or viscous polymers having a molecular weight of from about 200 to 10,000 g/mol, or solid waxy to plastic, or elastomeric materials having molecular weights of from about 100,000 to 1,000,000 g/mol, or more.

In some embodiments, the monomer is isobutylene, styrene, beta pinene, isoprene, butadiene, or substituted compounds of the preceding types. In some embodiments, the monomer is isobutylene, 2-methyl-1-butene, 3-methyl-1-butene, 4-methyl-1-pentene, or beta-pinene. In some embodiments, the monomer is isobutylene.

In some embodiments, mixtures of monomers may be used.

4.2.3 Lewis Acids

In some embodiments, the Lewis acid is a non-protic acid. In some embodiments, the Lewis acid is a metal halide or non-metal halide. In some embodiments, the Lewis acid is a metal halide. In some embodiments, the Lewis acid is a titanium (IV) halide, a zinc (II) halide, a tin (IV) halide, or an aluminum (III) halide. In some embodiments, the Lewis acid is a titanium (IV) halide. In some embodiments, the Lewis acid is a tin (IV) halide. In some embodiments, the Lewis acid an aluminum (III) halide. In some embodiments, the Lewis acid is titanium tetrabromide or titanium tetrachloride. In some embodiments, the Lewis acid is titanium tetrachloride. In some embodiments, the Lewis acid is zinc chloride. In some embodiments, the Lewis acid is ethyl aluminum dichloride. In some embodiments the Lewis acid is a non-metal halide. In some embodiments, the Lewis acid is an antimony (VI) halide, a gallium (III) halide, or a boron (III) halide. In some embodiments, the Lewis acid is boron trichloride.

4.2.4 Electron Donors

As is understood to one of ordinary skill in the art, some electron donors are capable of converting traditional polymerization systems into quasiliving polymerization systems. In some embodiments, the methods described herein are performed in the presence of an electron donor.

In some embodiments, the electron donor is capable of complexing with Lewis acids. In some embodiments, the electron donor is a base and/or nucleophile. In some embodiments, the electron donor is capable of abstracting or removing a proton. In some embodiments, the electron donor is an organic base. In some embodiments, the electron donor is an amide. In some embodiments, the electron donor is N,N-dimethylformamide, N,N-dimethylacetamide, or N,N-diethylacetamide. In some embodiments, the electron donor is a sulfoxide. In some embodiments, the electron donor is dimethyl sulfoxide. In some embodiments, the electron donor is an ester. In some embodiments, the electron donor is methyl acetate or ethyl acetate. In some embodiments, the electron donor is a phosphate compound. In some embodiments, the electron donor is trimethyl phosphate, tributyl phosphate, or triamide hexamethylphosphate. In some embodiments, the electron donor is an oxygen-containing metal compound. In some embodiments, the electron donor is tetraisopropyl titanate.

In some embodiments, the electron donor is pyridine or a pyridine derivative. In some embodiments, the electron donor is a compound of the formula:

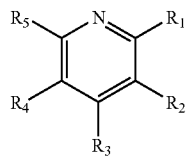

wherein $R_1$, $R_2$, $R_3$, $R_4$, and $R_5$ are each, independently, hydrogen or hydrocarbyl; or $R_1$ and $R_2$, or $R_2$ and $R_3$, or $R_3$ and $R_4$, or $R_4$ and $R_5$ independently form a fused aliphatic ring of about 3 to about 7 carbon atoms or a fused aromatic ring of about 5 to about 7 carbon atoms. In some embodiments, $R_1$ and $R_5$ are each, independently, hydrocarbyl, and $R_2$-$R_4$ are hydrogen.

In some embodiments, the electron donor is 2,6-di-tert-butylpyridine, 2,6-lutidine, 2,4-dimethylpryidine, 2,4,6-trimethylpyridine, 2-methylpyridine, or pyridine. In some embodiments, the electron donor is N,N-dimethylaniline or N,N-dimethyltoluidine. In some embodiments, the electron donor is 2,6-lutidine.

In some embodiments, more than one electron donor is used.

4.2.5 Diluents

In some embodiments of the methods described herein, the methods are performed in a diluent. In some embodiments, the diluent is a single compound or a mixture of two or more compounds. In some embodiments, the diluent completely dissolves the reaction components or partially dissolves the reaction components. In some embodiments, the diluent completely or nearly completely dissolves the reaction components. In some embodiments, the diluent completely dissolves the reaction components. In some embodiments, the diluent nearly completely dissolves the reaction components.

In some embodiments, the diluent has a low boiling point and/or low freezing point. In some embodiments, the diluent is an alkane, an alkyl monohalide, or an alkyl polyhalide. In some embodiments, the diluent is a normal alkane. In some embodiments, the diluent is propane, normal butane, normal pentane, normal hexane, normal heptane, normal octane, normal nonane or normal decane. In some embodiments, the diluent is a branched alkane. In some embodiments, the alkane is isobutane, isopentane, neopentane, isohexane, 3-methylpentane, 2,2-dimethylbutane, or 2,3-dimethylbutane. In some embodiments, the diluent is a halogenated alkane. In some embodiments, the diluent is chloroform, ethylchloride, n-butyl chloride, methylene chloride, methyl chloride, 1,2-dichloroethane, 1,1,2,2-tetrachloroethane, carbon tetrachloride, 1,1-dichloroethane, n-propyl chloride, isopropyl chloride, 1,2-dichloropropane, or 1,3-dichloropropane. In some embodiments, the diluent is an alkene or halogenated alkene. In some embodiments, the diluent is vinyl chloride, 1,1-dichloroethene, or 1,2-dichloroethene. In some embodiments, the diluent is carbon disulfide, sulfur dioxide, acetic anhydride, acetonitrile, benzene, toluene, methylcyclohexane, chlorobenzene, or nitroalkane. In some embodiments, the diluent is a mixture of the compounds in this paragraph.

In some embodiments, the diluent is a mixture of hexane and methyl chloride. In some embodiments, such mixture is from about 30/70 to about 70/30 hexane/methyl chloride by volume. In some embodiments, such mixture is from about 50/50 to about 100/0 hexane/methyl chloride by volume. In some embodiments, such mixture is about 60/40 hexane/methyl chloride by volume.

4.2.6 Temperature

In some embodiments, the methods described herein are performed at a temperature from about −150° C. to about −30° C. In some embodiments, the temperature is from about −150° C. to about −40° C. In some embodiments, the temperature is from about −100° C. to about −30° C. In some embodiments, the temperature is from about −100° C. to about −40° C. In some embodiments, the temperature is from about −90° C. to about −60° C. In some embodiments, the temperature is about −100° C. In some embodiments, the temperature is about −90° C. In some embodiments, the temperature is about −80° C. In some embodiments, the temperature is about −70° C. In some embodiments, the temperature is about −60° C. In some embodiments, the temperature is about −55° C. In some embodiments, the temperature is about −50° C. In some embodiments, the temperature is about −45° C. In some embodiments, the temperature is about −40° C. In some embodiments, the temperature is about −35° C. In some embodiments, the temperature is about −30° C.

Without being bound to any theory, in some embodiments, the addition of an electron donor has been found to increase the yield of exo-olefin terminated polyolefin. Without being limited to any theory, in some embodiments, when the quenching occurs at higher temperatures (e.g. greater than −50° C.) the addition of an electron donor has been found to increase the yield of exo-terminated polyolefin. Without being limited to any theory, in some embodiments, when the quenching occurs at higher temperatures (e.g. greater than −50° C.) the addition of 2,6-lutidine has been found to increase the yield of exo-terminated polyolefin. In some embodiments, the reaction temperature is from about −50° C. to about −30° C., the 2,6-lutidine concentration is about 0.05 M, the titanium tetrachloride concentration is about 0.2 M, the chain end concentration is about 0.035 M, the ethoxytrimethylsilane concentration is about 0.1 M, and the exo-olefin terminated polyolefin formed is at least 90 percent by mole of all products.

In some embodiments, the methods described herein are performed in the presence of 2,6lutidine, at a temperature of about −70° C. to about −30° C., and the polyolefin containing one or more exo-olefinic end groups formed is at least 90 percent by mole of all products.

In some embodiments, the methods described herein are performed in the presence of 2,6lutidine, at a temperature of about −70° C. to about −30° C., and the polyolefin containing one or more exo-olefinic end groups formed is at least 80 percent by mole of all products.

In some embodiments, the methods described herein are performed in the presence of 2,6lutidine, at a temperature of about −70° C. to about −30° C., and the polyolefin containing one or more exo-olefinic end groups formed is at least 70 percent by mole of all products.

4.2.7 Concentrations

In some embodiments, the alkoxysilane or ether is present in stoichiometric excess relative to chain end. In some embodiments, the alkoxysilane or ether is present at a concentration less than the chain end concentration.

In some embodiments, the alkoxysilane is present at a concentration of from about 1.1 to about 10 times the chain end concentration. In some embodiments, the alkoxysilane is present at a concentration of about 0.7 times to 7.5 times the chain end concentration. In some embodiments, the alkoxysilane is present at a concentration of about 0.85 to 6 times the chain end concentration. In some embodiments, the alkoxysilane is present at a concentration of from about 1.5 times to about 7.5 times the chain end concentration. In some embodiments, the alkoxysilane is present at a concentration of from about 2 times to about 6 times the chain end concentration. In some embodiments, the alkoxysilane is present at a concentration of from about 2 times to about 4 times the chain end concentration. In some embodiments, the alkoxysilane is present at a concentration of from about 2 times to about 3 times the chain end concentration. In some embodiments, the alkoxysilane is present at a concentration of about 1.5 times the chain end concentration. In some embodiments, the alkoxysilane is present at a concentration of about 2 times the chain end concentration. In some embodiments, the alkoxysilane is present at a concentration of about 3 times the chain end concentration. In some embodiments, the alkoxysilane is present at a concentration of about 4 times the chain end concentration. In some embodiments, the alkoxysilane is present at a concentration of about 5 times the chain end concentration. In some embodiments, the alkoxysilane is present at a concentration of about 6 times the chain end concentration. In some embodiments, the alkoxysilane is present at a concentration of about 7 times the chain end concentration. In some embodiments, the alkoxysilane is present at a concentration of about 0.7 times the chain end concentration. In some embodiments, the alkoxysilane is present at a concentration of about 0.8 times the chain end concentration. In some embodiments, the alkoxysilane is present at a concentration of about 0.85 times the chain end concentration. In some embodiments, the alkoxysilane is present at a concentration of about 0.9 times the chain end concentration. In some embodiments, the alkoxysilane is present at a concentration of about 0.95 times the chain end concentration. In some embodiments, the alkoxysilane concentration is about equal to the chain end concentration.

In some embodiments, the ether is present at a concentration of from about 1.1 to about 10 times the chain end concentration. In some embodiments, the ether is present at a concentration of about 0.7 times to 7.5 times the chain end concentration. In some embodiments, the ether is present at a concentration of about 0.85 to 6 times the chain end concentration. In some embodiments, the ether is present at a concentration of from about 1.5 times to about 7.5 times the chain end concentration. In some embodiments, the ether is present at a concentration of from about 2 times to about 6 times the chain end concentration. In some embodiments, the ether is present at a concentration of from about 2 to about 4 times the chain end concentration. In some embodiments, the ether is present at a concentration of from about 2 to about 3 times the chain end concentration. In some embodiments, the ether is present at a concentration of about 1.5 times the chain end concentration. In some embodiments, the ether is present at a concentration of about 2 times the chain end concentration. In some embodiments, the ether is present at a concentration of about 3 times the chain end concentration. In some embodiments, the ether is present at a concentration of about 4 times the chain end concentration. In some embodiments, the ether is present at a concentration of about 5 times the chain end concentration. In some embodiments, the ether is present at a concentration of about 6 times the chain end concentration. In some embodiments, the ether is present at a concentration of about 7 times the chain end concentration. In some embodiments, the ether is present at a concentration of about 0.7 times the chain end concentration. In some embodiments, the ether is present at a concentration of about 0.8 times the chain end concentration. In some embodiments, the ether is present at a concentration of about 0.85 times the chain end concentration. In some embodiments, the ether is present at a concentration of about 0.9 times the chain end concentration. In some embodiments, the ether is present at a concentration of about 0.95 times the chain end concentration. In some embodiments, the ether concentration is about equal to the chain end concentration.

In some embodiments, the alkoxysilane is present at a concentration of from about 0.15 to about 4 times the Lewis acid concentration. In some embodiments, the alkoxysilane is present at a concentration of from about 0.5 to about 3 times the Lewis acid concentration. In some embodiments, the alkoxysilane is present at a concentration of from about 0.75 to about 2 times the Lewis acid concentration. In some embodiments, the alkoxysilane concentration is about 0.5 times the Lewis acid concentration. In some embodiments, the alkoxysilane concentration is about 0.75 times the Lewis acid concentration. In some embodiments, the alkoxysilane concentration is about equal to the Lewis acid concentration. In some embodiments, the alkoxysilane concentration is about 0.2 times the Lewis acid concentration. In some embodiments, the alkoxysilane concentration is about 0.3 times the Lewis acid concentration. In some embodiments, the alkoxysilane concentration is about 0.4 times the Lewis acid concentration. In some embodiments, the alkoxysilane concentration is about 0.5 times the Lewis acid concentration. In some embodiments, the alkoxysilane concentration is about 0.6 times the Lewis acid concentration. In some embodiments, the alkoxysilane concentration is about 0.7 times the Lewis acid concentration. In some embodiments, the alkoxysilane concentration is about 0.8 times the Lewis acid concentration. In some embodiments, the alkoxysilane concentration is about 0.9 times the Lewis acid concentration. In some embodiments, the alkoxysilane concentration is about 1.0 times the Lewis acid concentration. In some embodiments, the alkoxysilane concentration is about 1.5 times the Lewis acid concentration. In some embodiments, the alkoxysilane concentration is about 2 times the Lewis acid concentration. In some embodiments, the alkoxysilane concentration is about 2.5 times the Lewis acid concentration. In some embodiments, the alkoxysilane concentration is about 3 times the Lewis acid concentration.

In some embodiments, the ether is present at a concentration of from about 0.15 to about 4 times the Lewis acid concentration. In some embodiments, the ether is present at a concentration of from about 0.5 to about 3 times the Lewis acid concentration. In some embodiments, the ether is present at a concentration of from about 0.75 to about 2 times the Lewis acid concentration. In some embodiments, the ether concentration is about 0.5 times the Lewis acid concentration. In some embodiments, the ether concentration is about 0.75 times the Lewis acid concentration. In some embodiments, the ether concentration is about equal to the Lewis acid concentration. In some embodiments, the ether concentration is about 0.2 times the Lewis acid concentration. In some embodiments, the ether concentration is about 0.3 times the Lewis acid concentration. In some embodiments, the ether concentration is about 0.4 times the Lewis acid concentration. In some embodiments, the ether concentration is about 0.5 times the Lewis acid concentration. In some embodiments, the ether concentration is about 0.6 times the Lewis acid concentration. In some embodiments, the ether concentration is about 0.7 times the Lewis acid concentration. In some embodiments, the ether concentration is about 0.8 times the Lewis acid concentration. In some embodiments, the ether concentration is about 0.9 times the Lewis acid concentration. In some embodiments, the ether concentration is about 1.0 times the Lewis acid concentration. In some embodiments, the ether concentration is about 1.5 times the Lewis acid concentration. In some embodiments, the ether concentration is about 2 times the Lewis acid concentration. In some embodiments, the ether concentration is about 2.5 times the Lewis acid concentration. In some embodiments, the ether concentration is about 3 times the Lewis acid concentration.

In some embodiments, the methods described herein are performed at a chain end concentration from about 0.005 M to about 0.2 M. In some embodiments, the methods described herein are performed at a chain end concentration from about 0.010 M to about 0.14 M. In some embodiments, the methods described herein are performed at a chain end concentration from about 0.014 M to about 0.10 M. In some embodiments, the methods described herein are performed at a chain end concentration from about 0.014 M to about 0.040 M.

In some embodiments, the chain end concentration is from about 0.10 M to about 0.15 M, and the exo-olefin terminated polyolefin formed is at least 70 percent by mole of all products. In some embodiments, the chain end concentration is from about 0.10 M to about 0.15 M, and the exo-olefin terminated polyolefin formed is at least 80 percent by mole of all products. In some embodiments, the chain end concentration is from about 0.10 M to about 0.15 M, and the exo-olefin terminated polyolefin formed is at least 90 percent by mole of all products.

In some embodiments, the Lewis acid is added in two or more aliquots. In some embodiments, the Lewis acid is added in two aliquots. In some embodiments, a first aliquot of Lewis acid is added during the polymerization reaction, and a second aliquot of Lewis acid is added during the quenching reaction. In some embodiments, a first aliquot of titanium tetrachloride is added during the polymerization reaction, and a second aliquot is added during the quenching reaction. Without being bound to any theory, if alkoxysilane quenching is performed in situ from a direct polymerization (as opposed to re-initiation of tert-chloride polyisobutylene), the optimum $TiCl_4$ concentration may be too high for the prior polymerization reaction; this often occurs for reactions with relatively high chain-end concentrations. When this situation occurs, it is manifested in a polymerization that is too fast and/or too exothermic. In such case, in some embodiments, a lower concentration first aliquot of Lewis acid may be used for the polymerization, and after the alkoxysilane or ether has been added, a second aliquot of Lewis acid may be added such that the total Lewis acid concentration has been increased to that which is optimum for quenching.

In some embodiments, the alkoxysilane is added after the addition of Lewis acid. In some embodiments, the ether is added after the addition of Lewis acid. In some embodiments, the alkoxysilane is added prior to the addition of Lewis acid. In some embodiments, the ether is added prior to the addition of Lewis acid.

4.2.8 Exo-Olefin Selectivity

In some embodiments, the methods described herein selectively provide exo-olefin terminated polyolefins. In some embodiments, exo-olefin terminated polyolefin, polyolefins containing endo olefins, tert-halide polyolefins, and coupled polyolefins are reaction products. In some embodiments, the exo-olefin terminated polyolefin is the major product, and polyolefins containing endo olefins, tert-halide polyolefins, and coupled polyolefins are the minor products.

In some embodiments, the exo-olefin terminated polyolefin formed is at least 40 percent by mole of all products. In some embodiments, the exo-olefin terminated polyolefin formed is at least 50 percent by mole of all products. In some embodiments, the exo-olefin terminated polyolefin formed is at least 60 percent by mole of all products. In some embodiments, the exo-olefin terminated polyolefin formed is at least 75 percent by mole of all products. In some embodiments, the exo-olefin terminated polyolefin formed is at least 85 percent by mole of all products. In some embodiments, the exo-olefin terminated polyolefin formed is at least 90 percent by mole of all products. In some embodiments, the exo-olefin terminated polyolefin formed is at least 95 percent by mole of all products. In some embodiments, the exo-olefin terminated polyolefin formed is at least 97 percent by mole of all products. In some embodiments, the exo-olefin terminated polyolefin formed is at least 98 percent by mole of all products.

4.2.9 Terminators

In some embodiments, the terminator is a compound capable of deactivating a Lewis acid. In some embodiments, the terminator is a base and/or a nucleophile. In some embodiments, the terminator is a base. In some embodiments, the terminator is an electron donor. In some embodiments, the terminator is an organic base. In some embodiments, the terminator is an alcohol or amine. In some embodiments, the terminator is an alcohol. In some embodiments, the terminator is a pyridine derivative.

In some embodiments, the terminator is methanol, ethanol, or isopropanol. In some embodiments, the terminator is methanol. In some embodiments, the terminator is water. In some embodiments, the terminator is diethylamine, triethylamine, pyridine, 2,6-lutidine, n-butylamine, or tert-amylamine.

In some embodiments, the terminator is added after the quenching step.

5. EXAMPLES

5.1 Definitions of Abbreviations

As used herein, "allyloxyTMS" and "AOTMS" refer to allyloxytrimethylsilane.
As used herein, "coupled" refers to coupled polyolefin.
As used herein, "CE" refers to chain end.
As used herein, "DI" refers to deionized.
As used herein, "endo" refers to a polyolefin containing an endo-olefin.
As used herein, "ethoxyTMS" and "EtOTMS" refer to ethoxytrimethylsilane.
As used herein, "exo" refers to exo-olefin terminated polyolefin.
As used herein, "GPC" refers to gel permeation chromatography.
As used here, "GPC-MALLS" refers to gel permeation chromatography-multi-angle laser light scattering.
As used here, "hex" refers to hexane.
As used herein, "IB" refers to isobutylene.
As used herein, "26Lut" refers to 2,6-lutidine.
As used herein, "MeCl" refers to methyl chloride.
As used herein, "MeOH" refers to methyl alcohol.

As used herein, "methoxyTMS" and "MeOTMS" refer to methoxytrimethylsilane.

As used herein, "$M_n$" refers to number average molecular weight.

As used herein, "$M_w$" refers to weight average molecular weight.

As used herein, "NMR" refers to nuclear magnetic resonance.

As used herein, "PDI" refers to polydispersity index.

As used herein, "PIB" refers to polyisobutylene.

As used herein, "RT" refers to room temperature.

As used herein, "tert-halide" refers to tert-halide polyolefins.

As used herein, "t-Cl" refers to tert-chloride terminated polyolefin.

As used herein, "TMPCl" refers to 2-chloro-2,4,4-trimethylpentane.

As used herein "x CE" refers to times chain end concentration. For example, "2×CE" refers to 2 times chain end concentration.

5.2 Example 1

This example involved a direct polymerization of IB from TMPCl with in situ quenching in a single reactor. The quencher was allyloxytrimethylsilane. The conditions used were as follows:
[TMPCl]=0.014 M
[IB]=0.5 M
[TiCl$_4$]=0.083 M
[allyloxyTMS]=0.019 M
−60° C.
60/40 (v/v) Hex/MeCl For this polymerization and all subsequent polymerizations described herein, real-time, attenuated total reflectance (ATR) Fourier Transform infrared (FTIR) spectroscopy was used to monitor monomer conversion, spectra were gathered in real time using the ReactIR 4000 reaction analysis system (light conduit type) (ASI Applied Systems, Millersville, Md.) equipped with a DiComp (diamond-composite) insertion probe and a general purpose type PR-11 platinum resistance thermometer. Reaction conversion was determined by monitoring the area, above a two point baseline, of the absorbance centered at 887 cm$^{-1}$, associated with the =CH$_2$ wag of IB.

The polymerization procedure was as follows: A 250 mL glass reactor, equipped with an overhead mechanical stirrer and platinum resistance thermometer, was fitted to the end of the DiComp probe of the ReactIR 4000, and this assembly was immersed into a −60° C. constant-temperature heptane bath within the glove box. To the reactor were added 114.0 mL hexane, 76.0 mL MeCl, 0.48 mL (2.8 mmol, 0.014 M) TMPCl, and 0.23 mL (2.0 mmol, 0.01 M) 26Lut. The mixture was stirred to achieve thermal equilibrium, and a solvent background spectrum was acquired and subtracted from all subsequent spectra. At this point, FTIR data were continuously acquired to establish a solvent reference absorbance area, $A_r$, prior to monomer addition. Next, IB, 8.18 mL (0.5 M), was charged to the reactor, thermal equilibration was established, and data were again acquired prior to initiation, to establish the initial absorbance area, $A_o$, associated with the initial monomer concentration. The coinitiator, 1.82 mL (0.017 mol, 0.083 M, 6×CE) TiCl4 (neat and at room temperature), was then charged to the reactor. FTIR data were acquired continuously, and monomer conversion was calculated in real time as shown with Equation 1, $$\frac{[IB]_o - [IB]_t}{[IB]_o} = 1 - \frac{A_t - A_r}{A_o - A_r} \quad \text{Equation 1}$$

where $A_t$ is the instantaneous absorbance area at 887 cm$^{-1}$. The polymerization reaction proceeded until complete IB conversion, and a pre-quench aliquot was removed. Then 0.66 mL (3.9 mmol, 0.019 M, 1.4×CE) AOTMS (room temp) was added and aliquots were taken periodically and after 60 min quenching time, prechilled MeOH was added to terminate the reaction. Upon removal from the dry box, the terminated reaction mixture was allowed to warm to room temperature. Hexane (1-2 mL) was added to the prequench and other aliquot samples and a sample of the final polymer, and then the polymers were precipitated into MeOH. The recovered PIB was agitated (vortexed) with fresh MeOH to remove any remaining contaminants, and the MeOH was decanted. Samples were dried with gaseous nitrogen before NMR analysis.

NMR analysis of the pre-quench sample yielded a molar end group composition (%) as follows:

| | |
|---|---|
| Exo | 2 |
| t-Cl | 98 |
| Coupled | 0 |

NMR analysis of the final post-quench sample yielded a molar end group composition (%) as follows:

| | |
|---|---|
| Exo | 96 |
| t-Cl | 2 |
| Coupled | 2 |

5.3 Example 2

This example involved a direct polymerization of IB from TMPCl with in situ quenching in a single reactor. The quencher was methoxytrimethylsilane. The conditions used were as follows:
[TMPCl]=0.014 M
[IB]=0.5 M
[TiCl$_4$]=0.084 M
[methoxy TMS]=0.028 M
−60° C.
60/40 (v/v) Hex/MeCl The procedure was as follows: A stirred 250 mL glass reactor was equilibrated to −60.8° C. within the glove box. To the reactor were added 90.9 mL hexane, 60.6 mL MeCl, 0.38 mL (2.2 mmol, 0.014 M) TMPCl, 6.54 mL (0.5 M) IB, 0.06 mL (0.003 M) 26Lut, and 1.47 mL (0.013 mol, 0.084 M, 6×CE) TiCl$_4$. The polymerization reaction proceeded for 20 min, a pre-quench aliquot was removed, and then 0.62 mL (4.5 mmol, 0.028 M, 2×CE) MeOTMS (room temp) was added. The temperature of the reaction mixture rose to a peak of −59.8° C. and then gradually fell. Aliquots were taken periodically and after 60 min quenching time, prechilled MeOH was added to terminate the reaction. Upon removal from the dry box, the terminated reaction mixture was allowed to warm to room temperature. Hexane (1-2 mL) was added to the prequench and other aliquot samples and a sample of the final polymer, and then the polymers were precipitated into MeOH. The recovered PIB was agitated (vortexed) with fresh MeOH to remove any remaining contaminants, and the MeOH was decanted. Samples were dried with gaseous nitrogen before NMR analysis.

NMR analysis of the pre-quench sample yielded a molar end group composition (%) as follows:

| | |
|---|---|
| Exo | 1 |
| t-Cl | 99 |
| Coupled | 0 |

NMR analysis of the final post-quench sample yielded a molar end group composition (%) as follows:

| | |
|---|---|
| Exo | 98 |
| t-Cl | 1 |
| Coupled | 1 |

5.4 Example 3

This example involved re-ionization of an isolated and purified PIB sample carrying tert-chloride end groups. The quencher was ethoxytrimethylsilane.

The tert-chloride-terminated PIB was produced according to the following procedure: A stirred 1000 mL glass reactor was immersed into a −75° C. constant-temperature heptane/hexane bath within the glove box. Into the flask were charged 654.5 mL MeCl, 6.12 mL (0.036 mol, 0.045 M) TMPCl, 0.58 mL (4.9 mmol, 0.0062 M) 26Lut, 97.2 mL (1.2 mol, 1.5 M) IB, and 41.6 mL (0.53 mol, 0.68 M) $BCl_3$ (neat). The polymerization reaction reached high conversion of the IB (~99%) in about 5 h, at which time the reaction was terminated by careful addition of excess, prechilled MeOH. The terminated reaction mixture was transferred to a 10000 mL beaker, and the solvents were allowed to evaporate overnight. The polymer and remaining non-volatiles were diluted with hexane and were washed several times with MeOH and slightly acidified water. The polymer solution was stirred over $MgSO_4$ in order to remove any residual water, and the polymer was isolated by filtration and dried at room temperature in a vacuum oven. The theoretical $M_n$ for the masterbatch polymer was 2,049 g/mol and GPC-MALLS analysis of the product using a dn/dc of 0.110 yielded $M_n$=1,890 g/mol and $M_w/M_n$=1.01. A stock solution of the masterbatch polymer was created by dissolving 9.54 g of the polymer in 60 mL hexane. The molar concentration of this solution was 0.067 mol/L, based on the theoretical $M_n$ of the polymer.
NMR analysis of the end group composition (%) yielded the following:

| | |
|---|---|
| Exo | 9.1 |
| Endo | 0 |
| t-Cl | 90.8 |
| Coupled | 0.1 |

The conditions that were used for quenching were as follows:
[CE]=0.037 M
[ethoxyTMS]=0.28 M
[$TiCl_4$]=0.23 M
−70° C.
60/40 (v/v) Hex/MeCl Quenching was carried out as follows: A 50 mL glass test tube was equilibrated to −70° C. within the glove box. To the tube were added 6.0 mL of a 0.067 M solution of PIB masterbatch, 4.0 mL MeCl, and 0.47 mL (3.0 mmol, 0.28 M, 7.5×[CE]) EtOTMS, and the contents were allowed to equilibrate. Then 0.27 mL (2.5 mmol, 0.23 M, 6.1×[CE]) $TiCl_4$ was added and the tube was shaken by hand periodically. After 60 min quenching time, prechilled MeOH was added to terminate the reaction. Upon removal from the dry box, the terminated reaction mixture was allowed to warm to room temperature. Hexane (1-2 mL) was added to the polymer, and then the polymer was precipitated into MeOH. The recovered PIB was agitated (vortexed) with fresh MeOH to remove any remaining contaminants, and the MeOH was decanted. Samples were dried with gaseous nitrogen before NMR analysis.

NMR analysis of the final post-quench sample yielded a molar end group composition (%) as follows:

| | |
|---|---|
| Exo | 97.1 |
| Endo | 1.9 |
| t-Cl | 0 |
| Coupled | 1.0 |

5.5 Example 4

This example involved re-ionization of an isolated and purified PIB sample carrying tert-chloride end groups. The quencher was ethoxytrimethylsilane.

The tert-chloride-terminated PIB was produced according to the following procedure: A stirred 1000 mL glass reactor was equilibrated to −60° C. within the glove box. To the reactor were added 361.3 mL hexane, 240.9 mL MeCl, 5.72 mL (0.034 mol, 0.045 M) TMPCl, 122.7 mL (2.0 M) IB, 0.87 mL (0.01 M) 26Lut, and 18.5 mL (0.17 mol, 0.22 M, 5×CE) $TiCl_4$. The polymerization reaction proceeded for 15 min, reaching a maximum temperature of −37.4° C. After full conversion of the IB, prechilled MeOH was added to terminate the reaction. Upon removal from the dry box, the terminated reaction mixture was allowed to warm to room temperature. Hexane was added to the polymer and then the solution was washed several times each with MeOH, acidic DI water, and DI water. The final sample was dried in vacuo at room temp to remove any remaining solvents prior to NMR and GPC analysis. The theoretical $M_n$ for the masterbatch polymer was 2,650 g/mol and GPC-MALLS analysis of the product using a dn/dc of 0.111 yielded $M_n$=2,850 g/mol and PDI=1.03. A stock solution of the masterbatch polymer was created by dissolving 11.553 g of the polymer in 60 mL hexane. The molar concentration of this solution was 0.061 mol/L, based on the theoretical $M_n$ of the polymer.

NMR analysis of the end group composition (%) yielded the following:

| | |
|---|---|
| Exo | 17.1 |
| Endo | 8.0 |
| t-Cl | 73.6 |
| Coupled | 0.7 |

The conditions that were used for quenching were as follows:
[CE]=0.035 M
[ethoxyTMS]=0.096 M
[$TiCl_4$]=0.19 M
−60° C.
60/40 (v/v) Hex/MeCl Quenching was carried out as follows: A 50 mL glass test tube was equilibrated to −70° C. within the glove box. To the tube were added 6.0 mL of a 0.061M solution of PIB masterbatch, 4.0 mL MeCl, and 0.156 mL (1.0 mmol, 0.096 M, 2.7×[CE]) EtOTMS, and the contents were allowed to equilibrate. Then 0.22 mL (2.0 mmol, 0.19 M, 5.5×[CE]) $TiCl_4$ was added and the tube was shaken by hand periodically. After 30 min quenching time, prechilled MeOH was added to terminate the reaction. Upon removal from the dry box, the terminated reaction mixture was allowed to warm to room temperature. Hexane (1-2 mL) was added to the polymer, and then the polymer was precipitated into MeOH. The recovered PIB was agitated (vortexed) with fresh MeOH to remove any remaining contaminants, and the MeOH was decanted. Samples were dried with gaseous nitrogen before NMR analysis.

NMR analysis of the final post-quench sample yielded a molar end group composition (%) as follows:

| | |
|---|---|
| Exo | 90.1 |
| Endo | 9.9 |
| t-Cl | 0.0 |
| Coupled | 0.0 |

5.6 Example 5

This example involved a direct polymerization of IB with in situ quenching in a single reactor. The quencher was tert-butyl ethyl ether. The conditions used were as follows:

[TMPCl]=0.014 M
[IB]=0.5 M
$[TiCl_4]$=0.084 M
[t-butyl ethyl ether]=0.028 M
−60° C.
60/40 (v/v) Hex/MeCl Quenching was carried out as follows:

A stirred 250 mL glass reactor was equilibrated to −60° C. within the glove box. To the reactor were added 90.9 mL hexane, 60.6 mL MeCl, 0.38 mL (2.2 mmol, 0.014 M) TMPCl, 6.54 mL (0.5 M) IB, 0.06 ml, (0.003 M) 26Lut, and 1.47 mL (0.013 mol, 0.084 M, 6×CE) $TiCl_4$. The polymerization reaction proceeded for 20 min and then 0.62 mL (4.5 mmol, 0.028 M, 2×CE) t-butyl ethyl ether (room temp) was added. Aliquots were taken periodically and after 60 min quenching time, prechilled MeOH was added to terminate the reaction. Upon removal from the dry box, the terminated reaction mixture was allowed to warm to room temperature. H-lexane (1-2 mL) was added to the aliquot samples and a sample of the final polymer, and then the polymers were precipitated into MeOH. The recovered PIB was agitated (vortexed) with fresh MeOH to remove any remaining contaminants, and the MeOH was decanted. Samples were dried with gaseous nitrogen before NMR analysis.

NMR analysis of the final post-quench sample yielded a molar end group composition (%) as follows:

| | |
|---|---|
| Exo | 83 |
| t-Cl | 14 |
| Coupled | 3 |

5.7 Example 6

This example involved a direct polymerization of IB with in situ quenching in a single reactor. The quencher was ethoxytrimethylsilane. The conditions used were as follows:

Polymerization:
[TMPCl]=0.13 M
[IB]=5.2 M
$[TiCl_4]$=0.032 M
Quench:
[CE]=0.10 M
$[TiCl_4]$=0.83 M
[EthoxyTMS]=0.63 M A stirred 1000 mL glass reactor was equilibrated to −77.3° C. within the glove box. To the reactor were added 253.9 mL hexane, 169.3 mL MeCl, 16.4 mL (0.096 mol, 0.13 M) TMPCl, 306.7 mL (5.2 M) IB, 1.05 mL (0.012 M) 26Lut, and 2.6 mL (0.024 mol, 0.032 M, 0.25×CE) $TiCl_4$. The polymerization reaction proceeded for 100 min, reaching a maximum temperature of −61.2° C. When the temperature of the reactor contents had fallen back to −70.4° C., a pre-quench aliquot was removed, and then 90.0 mL (0.58 mol, 6×CE) EtOTMS (slightly chilled) was added, followed immediately by addition of 81.7 mL (0.75 mol, 7.72×CE) $TiCl_4$ (neat, RT). The temperature of the reaction mixture rose to a peak of −52.1° C. and then gradually fell. Aliquots were taken periodically and after 30 min quenching time, prechilled MeOH was added to terminate the reaction. The reaction was quite viscous, but seemed to terminate completely after addition of MeOH. Upon removal from the dry box, the terminated reaction mixture was allowed to warm to room temperature. Hexane (1-2 mL) was added to the prequench and other aliquot samples and a sample of the final polymer, and then the polymers were precipitated into MeOH. The recovered PIB was agitated (vortexed) with fresh MeOH to remove any remaining contaminants, and the MeOH was decanted. Samples were dried with gaseous nitrogen before NMR analysis, and then in vacuo at room temp to remove any remaining solvents prior to GPC analysis.

NMR analysis of the pre-quench sample yielded a molar end group composition (%) as follows:

| | |
|---|---|
| Exo | 9.5 |
| Endo | 2.1 |
| t-Cl | 85.8 |
| Coupled | 2.7 |

NMR analysis of the final post-quench sample yielded a molar end group composition (%) as follows:

| | |
|---|---|
| Exo | 94.6 |
| Endo | 1.9 |
| t-Cl | 0.0 |
| Coupled | 3.5 |

GPC traces ($R_1$ detector) of pre-quench and post-quench aliquots were identical. GPC-MALLS yielded $M_n$=3,300 g/mol and $M_w/M_n$=1.1.

5.8 Example 7

This example involved a direct polymerization of IB from TMPCl with in situ quenching in a single reactor. The quencher was allyloxytrimethylsilane. The conditions used were as follows:

[TMPCl]=0.014 M
[IB]=0.5 M
[TiCl$_4$]0.083 M
[26Lut]=0.01 M
[allyloxyTMS]=0.012 M
−60° C.
60/40 (v/v) flex/MeCl The procedure was as follows: A stirred 250 mL glass reactor was equilibrated to −60.0° C. within the glove box. To the reactor were added 114.0 mL hexane, 76.0 mL MeCl, 0.48 mL (2.8 mmol, 0.014 M) TMPCl, 8.18 mL (0.5 M) IB, 0.23 mL (2.0 mmol, 0.01 M) 26Lut, and 1.82 mL (0.017 mol, 0.083 M, 6×CE) TiCl$_4$. The polymerization reaction proceeded until complete IB conversion. Then 0.41 mL (2.4 mmol, 0.012 M, 0.86×CE) AOTMS (room temp) was added and aliquots were taken periodically and after 62 min quenching time, prechilled MeOH was added to terminate the reaction. Upon removal from the dry box, the terminated reaction mixture was allowed to warm to room temperature. Hexane (1-2 mL) was added to the aliquot samples and a sample of the final polymer, and then the polymers were precipitated into MeOH. The recovered PIB was agitated (vortexed) with fresh MeOH to remove any remaining contaminants, and the MeOH was decanted. Samples were dried with gaseous nitrogen before NMR analysis.

NMR analysis of the final post-quench sample yielded a molar end group composition (%) as follows:

| | |
|---|---|
| Exo | 79 |
| t-Cl | 13 |
| Coupled | 8 |

5.9 Example 8

This example involved a direct polymerization of IB from TMPCl with in situ quenching in a single reactor. The quencher was allyloxytrimethylsilane. The conditions used were as follows:
[TMPCl]=0.14 M
[IB]=5.0 M
[TiCl$_4$]=0.28 M
[allyloxyTMS]=0.28 M
[26Lut]=0.10 M
−60° C.
60/40 (v/v) Hex/MeCl The procedure was as follows: A stirred 250 mL glass reactor was equilibrated to −60.0° C. within the glove box. To the reactor were added 31.5 mL hexane, 21.0 mL MeCl, 2.38 mL (0.014 mol, 0.14 M) TMPCl, 40.9 mL (5.0 M) IB, 1.16 mL (0.01 mol, 0.1 M) 26Lut, and 3.07 mL (0.028 mol, 0.28 M, 2×CE) TiCl$_4$. The polymerization reaction proceeded until complete IB conversion. Then 4.6 mL (0.27 mol, 0.026 M, 1.9×CE) AOTMS (room temp) was added and aliquots were taken periodically and after 105 min quenching time, prechilled MeOH was added to terminate the reaction. Upon removal from the dry box, the terminated reaction mixture was allowed to warm to room temperature. Hexane (1-2 mL) was added to the aliquot samples and a sample of the final polymer, and then the polymers were precipitated into MeOH. The recovered PIB was agitated (vortexed) with fresh MeOH to remove any remaining contaminants, and the MeOH was decanted. Samples were dried with gaseous nitrogen before NMR analysis.

NMR analysis of the final post-quench sample yielded a molar end group composition (%) as follows:

| | |
|---|---|
| Exo | 85 |
| t-Cl | 15 |
| Coupled | 1 |

5.10 Example 9

This example involved re-ionization of an isolated and purified PIB sample carrying tert-chloride end groups. The quencher was ethoxytrimethylsilane. The PIB masterbatch that was used for this example is described in Example 4 above.

The conditions that were used for quenching were as follows:
[CE]=0.036 M
[ethoxyTMS]=0.097 M
[TiCl$_4$]=0.097 M
[26Lut]=0.024 M
−60° C.
60/40 (v/v) Hex/MeCl Quenching was carried out as follows: A 50 mL glass test tube was equilibrated to −60° C. within the glove box. To the tube were added 6.0 mL of a 0.061M solution of PIB masterbatch, 4.0 mL MeCl, 0.029 mL (0.25 mmol, 0.024 M, 0.68×[CE]) 26Lut, and 0.156 mL (1.0 mmol, 0.097 M, 2.7×[CE]) EtOTMS, and the contents were allowed to equilibrate. Then 0.11 mL TiCl$_4$ (1.0 mmol, 0.097 M, 2.7×[CE]) was added and the tube was shaken by hand periodically. After 30 min quenching time, prechilled MeOH was added to terminate the reaction. Upon removal from the dry box, the terminated reaction mixture was allowed to warm to room temperature. Hexane (1-2 mL) was added to the polymer, and then the polymer was precipitated into MeOH. The recovered PIB was agitated (vortexed) with fresh MeOH to remove any remaining contaminants, and the MeOH was decanted. Samples were dried with gaseous nitrogen before NMR analysis.

NMR analysis of the final post-quench sample yielded a molar end group composition (%) as follows:

| | |
|---|---|
| Exo | 89.3 |
| Endo | 8.9 |
| t-Cl | 0.0 |
| Coupled | 1.8 |

5.11 Example 10

This example involved re-ionization of an isolated and purified PIB sample carrying tert-chloride end groups. The quencher was ethoxytrimethylsilane. The PIB masterbatch that was used for this example is described in Example 4 above.

The conditions that were used for quenching were as follows:
[CE]=0.035 M
[ethoxyTMS]=0.096 M
[TiCl$_4$]=0.19 M
[26Lut]=0.048 M
−60° C.
60/40 (v/v) Hex/MeCl Quenching was carried out as follows: A 50 mL glass test tube was equilibrated to −60° C. within the glove box. To the tube were added 6.0 mL of a 0.061M solution of PIB masterbatch, 4.0 mL MeCl, 0.058 mL (0.50 mmol, 0.048 M, 1.4×[CE]) 26Lut, and 0.156 mL (1.0 mmol, 0.096 M, 2.7×[CE]) EtOTMS, and the contents were allowed to equilibrate. Then 0.22 mL (2.0 mmol, 0.19 M, 5.5×[CE]) $TiCl_4$ was added and the tube was shaken by hand periodically. After 30 min quenching time, prechilled MeOH was added to terminate the reaction. Upon removal from the dry box, the terminated reaction mixture was allowed to warm to room temperature. Hexane (1-2 mL) was added to the polymer, and then the polymer was precipitated into MeOH. The recovered PIB was agitated (vortexed) with fresh MeOH to remove any remaining contaminants, and the MeOH was decanted. Samples were dried with gaseous nitrogen before NMR analysis.

NMR analysis of the final post-quench sample yielded a molar end group composition (%) as follows:

| | |
|---|---|
| Exo | 87.7 |
| Endo | 8.8 |
| t-Cl | 0.0 |
| Coupled | 3.5 |

5.12 Example 11

This example involved re-ionization of an isolated and purified PIB sample carrying tert-chloride end groups. The quencher was ethoxytrimethylsilane. The PIB masterbatch that was used for this example is described in Example 4 above.

The conditions that were used for quenching were as follows:
[CE]=0.035 M
[ethoxyTMS]=0.096 M
$[TiCl_4]$=0.19 M
[26Lut]=0.05 M
−60° C.
60/40 (v/v) Hex/MeCl Quenching was carried out as follows: A 50 mL glass test tube was equilibrated to −60° C. within the glove box. To the tube were added 6.0 mL of a 0.061M solution of PIB masterbatch, 4.0 mL MeCl, and 0.06 mL (0.52 mmol, 0.05 M, 1.4×[CE]) 26Lut, and the contents were allowed to equilibrate. Then 0.22 mL (2.0 mmol, 0.19 M, 5.5×[CE]) $TiCl_4$ was added and the tube was shaken by hand. Then 0.156 mL (1.0 mmol, 0.096 M, 2.7×[CE]) EtOTMS was added and the tube was shaken by hand periodically. After 30 min quenching time, prechilled MeOH was added to terminate the reaction. Upon removal from the dry box, the terminated reaction mixture was allowed to warm to room temperature. Hexane (1-2 mL) was added to the polymer, and then the polymer was precipitated into MeOH. The recovered PIB was agitated (vortexed) with fresh MeOH to remove any remaining contaminants, and the MeOH was decanted. Samples were dried with gaseous nitrogen before NMR analysis.

NMR analysis of the final post-quench sample yielded a molar end group composition (%) as follows:

| | |
|---|---|
| Exo | 85.5 |
| Endo | 11.1 |
| t-Cl | 0.0 |
| Coupled | 3.4 |

5.13 Example 12

This example involved re-ionization of an isolated and purified PIB sample carrying tert-chloride end groups. The quencher was ethoxytrimethylsilane. The PIB masterbatch that was used for this example is described in Example 4 above.

The conditions that were used for quenching were as follows:
[CE]=0.035 M
[ethoxyTMS]=0.096 M
$[TiCl_4]$=0.19 M
[26Lut]=0.006 M
−30° C.
60/40 (v/v) Hex/MeCl Quenching was carried out as follows: A 50 mL glass test tube was equilibrated to −30° C. within the glove box. To the tube were added 6.0 mL of a 0.061M solution of PIB masterbatch, 4.0 mL MeCl, 0.007 mL (0.06 mmol, 0.006 M, 0.16×[CE]) 26Lut, and 0.156 mL (1.0 mmol, 0.096 M, 2.7×[CE]) EtOTMS, and the contents were allowed to equilibrate. Then 0.22 mL (2.0 mmol, 0.19 M, 5.5×[CE]) $TiCl_4$ was added and the tube was shaken by hand periodically. After 30 min quenching time, prechilled MeOH was added to terminate the reaction. Upon removal from the dry box, the terminated reaction mixture was allowed to warm to room temperature. Hexane (1-2 mL) was added to the polymer, and then the polymer was precipitated into MeOH. The recovered PIB was agitated (vortexed) with fresh MeOH to remove any remaining contaminants, and the MeOH was decanted. Samples were dried with gaseous nitrogen before NMR analysis.

NMR analysis of the final post-quench sample yielded a molar end group composition (%) as follows:

| | |
|---|---|
| Exo | 40.2 |
| Endo | 18.1 |
| t-Cl | 36.0 |
| Coupled | 5.6 |

5.14 Example 13

This example involved re-ionization of an isolated and purified PIB sample carrying tert-chloride end groups. The quencher was ethoxytrimethylsilane. The PIB masterbatch that was used for this example is described in Example 4 above.

The conditions that were used for quenching were as follows:
[CE]=0.035 M
[ethoxyTMS]=0.096 M
$[TiCl_4]$=0.19 M
[26Lut]=0.05 M
−30° C.
60/40 (v/v) Hex/MeCl Quenching was carried out as follows: A 50 mL glass test tube was equilibrated to −30° C. within the glove box. To the tube were added 6.0 mL of a 0.061M solution of PIB masterbatch, 4.0 mL MeCl, 0.06 mL (0.52 mmol, 0.05 M, 1.4×[CE]) 26Lut, and 0.156 mL (1.0 mmol, 0.096 M, 2.7×[CE]) EtOTMS, and the contents were allowed to equilibrate. Then 0.22 mL $TiCl_4$ (2.0 mmol, 0.19 M, 5.5×[CE]) was added and the tube was shaken by hand periodically. After 30 min quenching time, prechilled MeOH was added to terminate the reaction. Upon removal from the dry box, the terminated reaction mixture was allowed to warm to room temperature. Hexane (1-2 mL) was added to the polymer, and then the polymer was precipitated into MeOH. The recovered PIB was agitated (vortexed) with fresh MeOH to remove any remaining contaminants, and the MeOH was decanted. Samples were dried with gaseous nitrogen before NMR analysis.

NMR analysis of the final post-quench sample yielded a molar end group composition (%) as follows:

| | |
|---|---|
| Exo | 90.1 |
| Endo | 9.0 |
| t-Cl | 0.0 |
| Coupled | 0.9 |

5.15 Example 14

This example involved re-ionization of an isolated and purified PIB sample carrying tert-chloride end groups. The quencher was ethoxytrimethylsilane. The PIB masterbatch that was used for this example is described in Example 3 above.

The conditions that were used for quenching were as follows:
[CE]=0.038 M
[ethoxyTMS]=0.28 M
[TiCl$_4$]=0.095 M
−70° C.
60/40 (v/v) Hex/MeCl Quenching was carried out as follows: A 50 mL glass test tube was equilibrated to −70° C. within the glove box. To the tube were added 6.0 mL of a 0.067M solution of PIB masterbatch, 4.0 mL MeCl, and 0.47 mL (3.0 mmol, 0.28 M, 7.5× [CE]) EtOTMS, and the contents were allowed to equilibrate. Then 0.11 mL TiCl$_4$ (1.0 mmol, 0.095 M, 2.5×[CE]) was added and the tube was shaken by hand periodically. After 60 min quenching time, prechilled MeOH was added to terminate the reaction. Upon removal from the dry box, the terminated reaction mixture was allowed to warm to room temperature. Hexane (1-2 mL) was added to the polymer, and then the polymer was precipitated into MeOH. The recovered PIB was agitated (vortexed) with fresh MeOH to remove any remaining contaminants, and the MeOH was decanted. Samples were dried with gaseous nitrogen before NMR analysis.

NMR analysis of the final post-quench sample yielded a molar end group composition (%) as follows:

| | |
|---|---|
| Exo | 66.7 |
| Endo | 1.3 |
| t-Cl | 31.3 |
| Coupled | 0.7 |

Since modifications would be apparent to those of skill in the art, this disclosure is intended to be limited only by the scope of the appended claims.

What is claimed is:

1. A method for preparing a polyolefin containing one or more exo-olefinic end groups on the polyolefin chain, comprising quenching an ionized polyolefin with an alkoxysilane or an ether.

2. The method of claim 1, wherein the alkoxysilane or ether compound has the formula:

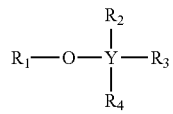

wherein Y is carbon or silicon; and
R$_1$ is hydrocarbyl, and R$_2$-R$_4$ are each, independently, hydrogen or hydrocarbyl.

3. The method of claim 2, wherein:
R$_1$ is alkyl, alkenyl, alkynyl, aryl, alkaryl, or aralkyl; and
R$_2$, R$_3$, and R$_4$ are each, independently, hydrogen, alkyl, alkenyl, alkynyl, aryl, alkaryl, or aralkyl, or R$_2$ and R$_3$, or R$_2$ and R$_4$, or R$_3$ and R$_4$ independently form a fused aliphatic ring of about 3 to about 7 carbon atoms.

4. The method of claim 1, wherein the ionized polyolefin is quenched with an alkoxysilane.

5. The method of claim 1, wherein the ionized polyolefin is quenched with an ether.

6. The method of claim 4, wherein the alkoxysilane has the formula:

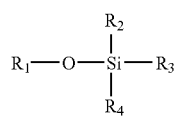

wherein:
R$_1$ is alkyl, alkenyl, alkynyl, aryl, alkaryl, or aralkyl; and
R$_2$, R$_3$, and R$_4$ are each, independently, hydrogen, alkyl, alkenyl, alkynyl, aryl, alkaryl, or aralkyl, or R$_2$ and R$_3$, or R$_2$ and R$_4$, or R$_3$ and R$_4$ independently form a fused aliphatic ring of about 3 to about 7 carbon atoms.

7. The method of claim 6, wherein R$_1$ is alkyl, alkenyl, alkynyl, or aralkyl.

8. The method of claim 6, wherein R$_1$ is alkyl, alkenyl, or alkynyl.

9. The method of claim 6, wherein R$_1$ is alkyl.

10. The method of claim 6, wherein R$_1$ is lower alkyl.

11. The method of claim 6, wherein R$_1$ is methyl, ethyl, or allyl.

12. The method of claim 6, wherein R$_1$ is methyl.

13. The method of claim 6, wherein R$_1$ is ethyl.

14. The method of claim 6, wherein R$_1$ is allyl.

15. The method of claim 6, wherein R$_2$, R$_3$, and R$_4$ are each, independently, hydrogen, alkyl, alkenyl, alkynyl, or aralkyl, or R$_2$ and R$_3$, or R$_2$ and R$_4$, or R$_3$ and R$_4$ independently form a fused aliphatic ring of about 3 to about 7 carbons.

16. The method of claim 6, wherein R$_2$, R$_3$, and R$_4$ are each, independently, hydrogen, alkyl, alkenyl, or alkynyl.

17. The method of claim 6, wherein R$_2$, R$_3$, and R$_4$ are each, independently, hydrogen or alkyl.

18. The method of claim 6, wherein R$_2$, R$_3$, and R$_4$ are each, independently, alkyl.

19. The method of claim 6, wherein R$_2$, R$_3$, and R$_4$ are each, independently, lower alkyl.

20. The method of claim 6, wherein R$_2$, R$_3$, and R$_4$ are each methyl.

21. The method of claim 6, wherein R$_2$, R$_3$, and R$_4$ are each hydrogen.

22. The method of claim 5, wherein the ether has the formula:

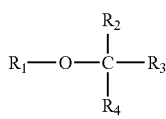

wherein:
R₁ is alkyl, alkenyl, alkynyl, aryl, alkaryl, or aralkyl; and
R₂, R₃, and R₄ are each, independently, hydrogen, alkyl, alkenyl, alkynyl, aryl, alkaryl, or aralkyl, or R₂ and R₃, or R₂ and R₄, or R₃ and R₄ independently form a fused aliphatic ring of about 3 to about 7 carbon atoms.

23. The method of claim 22, wherein R₁ is alkyl, alkenyl, alkynyl, or aralkyl.

24. The method of claim 22, wherein R₁ is alkyl, alkenyl, or alkynyl.

25. The method of claim 22, wherein R₁ is alkyl.

26. The method of claim 22, wherein R₁ is lower alkyl.

27. The method of claim 22, wherein R₁ is methyl, ethyl, or allyl.

28. The method of claim 22, wherein R₁ is methyl.

29. The method of claim 22, wherein R₁ is ethyl.

30. The method of claim 22, wherein R₁ is allyl.

31. The method of claim 22, wherein R₂, R₃, and R₄ are each, independently, hydrogen, alkyl, alkenyl, alkynyl, or aralkyl, or R₂ and R₃, or R₂ and R₄, or R₃ and R₄ independently form a fused aliphatic ring of about 3 to about 7 carbons.

32. The method of claim 22, wherein R₂, R₃, and R₄ are each, independently, hydrogen, alkyl, alkenyl, or alkynyl.

33. The method of claim 22, wherein R₂, R₃, and R₄ are each, independently, hydrogen or alkyl.

34. The method of claim 22, wherein R₂, R₃, and R₄ are each, independently, alkyl.

35. The method of claim 22, wherein R₂, R₃, and R₄ are each, independently, lower alkyl.

36. The method of claim 22, wherein R₂, R₃, and R₄ are each methyl.

37. The method of claim 22, wherein R₂, R₃, and R₄ are each hydrogen.

38. The method of claim 4, wherein the alkoxysilane is allyloxytrimethylsilane, ethoxytrimethylsilane, or methoxytrimethylsilane.

39. The method of claim 5, wherein the ether is tert-butyl ethyl ether or tert-butyl methyl ether.

40. The method of claim 1, wherein the ionized polyolefin is a quasiliving carbocationic polyolefin and the method is performed under quasiliving polymerization conditions.

41. The method of claim 40, wherein the quasiliving carbocationic polyolefin is prepared by adding a Lewis acid and a monomer to an initiator.

42. The method of claim 41, wherein the Lewis acid is a titanium tetrahalide, a boron trihalide, aluminum trichloride, tin tetrachloride, zinc chloride, or ethyl aluminum dichloride.

43. The method of claim 41, wherein the Lewis acid is titanium tetrachloride, titanium tetrabromide, or boron trichloride.

44. The method of claim 41, wherein the Lewis acid is titanium tetrachloride.

45. The method of claim 41, wherein the initiator is monofunctional.

46. The method of claim 41, wherein the initiator is 2-chloro-2-phenylpropane, 2-acetyl-2-phenylpropane, 2-propionyl-2-phenylpropane, 2-methoxy-2-phenylpropane, 2-ethoxy-2-phenylpropane, 2-chloro-2,4,4-trimethylpentane, 2-acetyl-2,4,4,-trimethylpentane, 2-propionyl-2,4,4-trimethylpentane, 2-methoxy-2,4,4-trimethylpentane, or 2-ethoxy-2,4,4-trimethylpentane.

47. The method of claim 41, wherein the initiator is 2-chloro-2,4,4-trimethylpentane.

48. The method of claim 41, wherein the initiator is bifunctional.

49. The method of claim 41, wherein the initiator is 1,3-di(2-chloro-2-propyl)benzene, 1,3-di(2-methoxy-2-propyl)benzene, 1,4-di(2-chloro-2-propyl)benzene, 1,4-di(2-methoxy-2-propyl)benzene, or 5-tert-butyl-1,3-di(2-chloro-2-propyl)benzene.

50. The method of claim 41, wherein the initiator is 5-tert-butyl-1,3,-di(2-chloro-2-propyl)benzene.

51. The method of claim 41, wherein the initiator is multifunctional.

52. The method of claim 41, wherein the initiator is 1,3,5-tri(2-chloro-2-propyl)benzene or 1,3,5-tri(2-methoxy-2-propyl)benzene.

53. The method of claim 41, wherein more than one monomer is used.

54. The method of claim 41, wherein the monomer is isobutylene, 2-methyl-1-butene, 3-methyl-1-butene, or 4-methyl-1-pentene.

55. The method of claim 41, wherein the monomer is isobutylene.

56. The method of claim 1, wherein the ionized polyolefin is formed by adding a Lewis acid to a tert-halide terminated polyolefin.

57. The method of claim 56, wherein the Lewis acid is a titanium tetrahalide, a boron trihalide, aluminum trichloride, tin tetrachloride, zinc chloride, or ethyl aluminum dichloride.

58. The method of claim 56, wherein the Lewis acid is titanium tetrachloride, titanium tetrabromide, or boron trichloride.

59. The method of claim 56, wherein the Lewis acid is titanium tetrachloride.

60. The method of claim 1, wherein multiple alkoxysilanes or multiple ethers are used.

61. The method of claim 1, wherein the method is performed at a temperature from about −150° C. to about −30° C.

62. The method of claim 61, wherein the temperature is from about −90° C. to about −60° C.

63. The method of claim 61, wherein the temperature is about −60° C.

64. The method of claim 1, wherein the alkoxysilane is present in stoichiometric excess relative to chain end.

65. The method of claim 1, wherein the alkoxysilane is present at a concentration of from about 0.86 to 7.5 times chain end concentration.

66. The method of claim 1, wherein the alkoxysilane is present at a concentration of from about 1.5 times to about 7.5 times chain end concentration.

67. The method of claim 1, wherein the alkoxysilane is present at a concentration of from about 2 times to about 3 times chain end concentration.

68. The method of claim 1, wherein the alkoxysilane is present at a concentration of from about 0.15 times to about 3 times Lewis acid concentration.

69. The method of claim 1, wherein the alkoxysilane is present at a concentration of from about 0.75 times to about 2 times Lewis acid concentration.

70. The method of claim 1, wherein the alkoxysilane is present at a concentration about equal to Lewis acid concentration.

71. The method of claim 1, wherein the method is performed at a chain end concentration from about 0.010 M to about 0.14 M.

72. The method of claim 1, wherein the method is performed at a chain end concentration from about 0.014 M to about 0.10 M.

73. The method of claim 1, wherein the method is performed at a chain end concentration from about 0.014 M to about 0.040 M.

74. The method of claim 1, wherein the method is performed in the presence of one or more electron donors.

75. The method of claim 74, wherein the electron donor is a pyridine derivative.

76. The method of claim 74, wherein the electron donor is 2,6-lutidine.

77. The method of claim 1, wherein a terminator is used.

78. The method of claim 77, wherein the terminator is an alcohol or an amine.

79. The method of claim 77, wherein the terminator is an alcohol.

80. The method of claim 77, wherein the terminator is methyl alcohol.

81. The method of claim 1, wherein a diluent is used.

82. The method of claim 81, wherein the diluent is a mixture of methyl chloride and hexane.

83. The method of claim 82, wherein the mixture is from about 50/50 to about 100/0 hexane/methyl chloride by volume.

84. The method of claim 82, wherein the mixture is about 60/40 hexane/methyl chloride by volume.

85. The method of claim 1, wherein the ionized polyolefin is quenched for about 60 minutes.

86. The method of claim 1 wherein the ionized polyolefin is quenched for about 30 minutes.

87. The method of claim 1, wherein the ionized polyolefin is quenched for about 15 minutes.

88. The method of claim 1, wherein the ionized polyolefin is quenched for about 10 minutes.

89. The method of claim 1, wherein the ionized polyolefin is quenched for about 5 minutes.

90. The method of claim 1, wherein the polyolefin containing one or more exo-olefinic end groups formed is at least 40 percent by mole of all products.

91. The method of claim 1, wherein the polyolefin containing one or more exo-olefinic end groups formed is at least 60 percent by mole of all products.

92. The method of claim 1, wherein the polyolefin containing one or more exo-olefinic end groups formed is at least 80 percent by mole of all products.

93. The method of claim 1, wherein the polyolefin containing one or more exo-olefinic end groups formed is at least 85 percent by mole of all products.

94. The method of claim 1, wherein the polyolefin containing one or more exo-olefinic end groups formed is at least 90 percent by mole of all products.

95. The method of claim 1, wherein the polyolefin containing one or more exo-olefinic end groups formed is at least 95 percent by mole of all products.

96. The method of claim 1, wherein the polyolefin containing one or more exo-olefinic end groups formed is at least 97 percent by mole of all products.

97. The method of claim 1, wherein the polyolefin containing one or more exo-olefinic end groups formed is at least 98 percent by mole of all products.

* * * * *